United States Patent
Hu et al.

(10) Patent No.: US 12,470,699 B2
(45) Date of Patent: Nov. 11, 2025

(54) ENCODING METHOD, DECODING METHOD, AND ELECTRONIC DEVICE

(71) Applicant: HUAWEI TECHNOLOGIES CO., LTD., Guangdong (CN)

(72) Inventors: Gong Hu, Hangzhou (CN); Yufeng Lu, Hangzhou (CN); Cheng Wang, Hangzhou (CN); Peiyun Di, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/829,487

(22) Filed: Sep. 10, 2024

(65) Prior Publication Data

US 2024/0430411 A1    Dec. 26, 2024

Related U.S. Application Data

(63) Continuation of application No. PCT/CN2023/080113, filed on Mar. 7, 2023.

(30) Foreign Application Priority Data

Mar. 11, 2022  (CN) .................. 202210243272.9

(51) Int. Cl.
*H04N 7/12*   (2006.01)
*H04N 19/105*  (2014.01)
(Continued)

(52) U.S. Cl.
CPC ......... *H04N 19/105* (2014.11); *H04N 19/159* (2014.11); *H04N 19/172* (2014.11)

(58) Field of Classification Search
CPC .................................................. H04N 19/172
See application file for complete search history.

(56) References Cited

U.S. PATENT DOCUMENTS

2013/0322531 A1  12/2013  Chen et al.
2019/0124333 A1   4/2019  Roh

FOREIGN PATENT DOCUMENTS

WO  2020228833 A1  11/2020
WO  2021029987 A1   2/2021

OTHER PUBLICATIONS

Ruobing Zou, et al, "An Adaptive Motion Data Storage Reduction Method for Temporal Predictor", SAT 2015 18th International Conference, Austin, TX, USA, Jan. 1, 2012, XP019170065, total 12 pages.

(Continued)

*Primary Examiner* — Y Lee

(57) ABSTRACT

Embodiments of this application provide an encoding method, a decoding method, and an electronic device. The method includes: obtaining a current frame; obtaining a reconstructed picture corresponding to a reference frame of the current frame from an external reference list of an encoder, where the reference frame of the current frame is a frame encoded by the encoder, and the external reference list is independent of the encoder; performing, by the encoder, intra coding on the reconstructed picture; and performing, by the encoder, inter coding on the current frame based on a result of the intra coding, to obtain a bitstream corresponding to the current frame. In this way, the encoder may flexibly select a reference frame from the external reference list for encoding, thereby implementing cross-frame reference or cross-resolution reference, and improving flexibility of reference frame management of the encoder.

20 Claims, 18 Drawing Sheets

(51) Int. Cl.
*H04N 19/159* (2014.01)
*H04N 19/172* (2014.01)

(56) References Cited

OTHER PUBLICATIONS

Series H: Audiovisual and Multimedia Systems Infrastructure of audiovisual services—Coding of moving video, High efficiency video coding, Recommendation ITU-T H.265, Nov. 2019, total 712 pages.
"Series H: Audiovisual and Multimedia Systems, Infrastructure of Audiovisual Services—Coding of Moving Video, Advance Video Coding for Generic Audiovisual Services," ITU-T, Telecommunication Standardization Sector of ITU H.264, Jun. 2019, 836 pages.
ISO/IEC 14496-12, Information technology—Coding of audiovisual objects—Part 12: ISO base media file format, Dec. 15, 2015, total 248 pages.

ENCODING METHOD, DECODING METHOD, AND ELECTRONIC DEVICE

CROSS-REFERENCE TO RELATED APPLICATIONS

This application is a continuation of International Application No. PCT/CN2023/080113, filed on Mar. 7, 2023, which claims priority to Chinese Patent Application No. 202210243272.9, filed on Mar. 11, 2022. The disclosures of the aforementioned applications are hereby incorporated by reference in their entireties.

TECHNICAL FIELD

Embodiments of this application relate to the field of encoding and decoding technologies, and in particular, to an encoding method, a decoding method, and an electronic device.

BACKGROUND

As videos develop towards ultra-high-definition resolutions such as 4K (resolution: 4096×2160) and 8K (resolution: 7680×4320), encoders (such as hardware encoders) with high specifications, low latencies, and low power consumption gradually become a mainstream on a terminal device in a real-time communication (Real-Time Communication, RTC) video scene, so as to ensure that a user has good RTC video experience.

However, capabilities of these encoders are poor in a case of weak networks. As a result, video smoothness cannot be ensured when a network condition in an RTC scene deteriorates.

SUMMARY

To resolve the foregoing technical problem, this application provides an encoding method, a decoding method, and an electronic device. In the methods, a reference frame for a codec can be flexibly managed, and a poor capability of an encoder in a case of a weak network is improved, so that video smoothness can be ensured when a network condition in an RTC scene deteriorates.

According to a first aspect, an embodiment of this application provides an encoding method. The method includes: obtaining a current frame; obtaining a reconstructed picture corresponding to a reference frame of the current frame from an external reference list of an encoder, where the reference frame of the current frame is a frame encoded by the encoder, and the external reference list is independent of the encoder; performing, by the encoder, intra coding on the reconstructed picture; and performing, by the encoder, inter coding on the current frame based on a result of the intra coding, to obtain a bitstream corresponding to the current frame. In this way, the encoder may flexibly select a reference frame from the external reference list for encoding, thereby implementing cross-frame reference or cross-resolution reference, and improving flexibility of reference frame management of the encoder. This can improve a poor capability of the encoder in a case of a weak network, and ensure video smoothness when a network condition in an RTC scene deteriorates.

For example, that the external reference list is independent of the encoder means that the external reference list is located outside the encoder and is used to distinguish a reference list managed inside the encoder. Both the encoder and another module can access the external reference list.

For example, the encoder may include an encoder (for example, a software encoder) with flexible reference frame management, or may include an encoder (for example, a hardware encoder) with inflexible reference frame management. This is not limited in this application.

For example, after the bitstream corresponding to the current frame is obtained, the bitstream corresponding to the current frame may be sent to another device, or may be locally stored. This is not limited in this application.

For example, the encoder may perform, by using a quantization parameter less than a first preset threshold, intra coding on the reconstructed picture corresponding to the reference frame of the current frame. The first preset threshold may be set as required. For example, the first preset threshold is a number less than 10, for example, 2, 3, 4, 5, 6, 7, 8, or 9. This is not limited in this application. In this way, high-quality intra coding can be performed on the reconstructed picture corresponding to the reference frame of the current frame, thereby improving quality of a coded picture of the current frame.

For example, the encoder may perform, at a bit rate greater than a second preset threshold, intra coding on the reconstructed picture corresponding to the reference frame of the current frame. The second preset threshold may be set as required. This is not limited in this application. In this way, high-quality intra coding can also be performed on the reconstructed picture corresponding to the reference frame of the current frame, thereby improving coding quality of the current frame.

For example, there may be a plurality of encoding and decoding scenarios corresponding to the encoding method provided in this application, for example, a scenario in which a long-term reference frame is used for encoding, a scenario in which a temporal layered reference frame is used for encoding, and a scenario in which a resampled reference frame is used for encoding. This is not limited in this application.

It should be noted that the encoding method in this application may be a method for encoding a predictive frame (Predictive frame, P frame).

According to the first aspect, the method further includes: when it is determined that the current frame needs to be used as a reference frame for subsequent encoding, generating a reconstructed picture of the current frame based on the bitstream corresponding to the current frame; and adding the reconstructed picture of the current frame to the external reference list. In this way, a frame following the current frame can obtain the reconstructed picture of the reference frame from the external reference list.

According to the first aspect or any implementation of the first aspect, the adding the reconstructed picture of the current frame to the external reference list includes: resampling the reconstructed picture of the current frame; and adding a resampled reconstructed picture to the external reference list. In this way, a reconstructed picture corresponding to a resampled reference frame may be added to the external reference list, so as to facilitate subsequent encoding based on the resampled reference frame.

According to the first aspect or any implementation of the first aspect, the bitstream corresponding to the current frame includes a first identifier and first indication information. The first identifier identifies whether the current frame is encoded based on the external reference list, and the first indication information indicates the reconstructed picture corresponding to the reference frame of the current frame in the external reference list.

For example, the first identifier may further identify whether the current frame is encoded with reference to a long-term reference frame/temporal layered reference frame/resampled reference frame.

For example, the bitstream corresponding to the current frame may alternatively include only the first identifier. In this case, the first identifier indicates that the current frame is not encoded based on the external reference list.

According to the first aspect or any implementation of the first aspect, the bitstream corresponding to the current frame includes a second identifier and second indication information. The second identifier identifies whether the current frame is used as the reference frame for subsequent encoding, and the second indication information indicates the reconstructed picture of the current frame in the external reference list.

For example, the bitstream corresponding to the current frame may alternatively include only the second identifier. In this case, the second identifier indicates that the current frame is not used as the reference frame for subsequent encoding.

According to the first aspect or any implementation of the first aspect, the bitstream corresponding to the current frame includes a third identifier, third indication information, and a resampling resolution. The third identifier identifies whether resampling is performed on the current frame, the third indication information indicates the resampled reconstructed picture of the current frame in the external reference list, and the resampling resolution includes a resolution corresponding to the reconstructed picture of the current frame and a resolution corresponding to the resampled reconstructed picture.

For example, the bitstream corresponding to the current frame may alternatively include only the third identifier. In this case, the third identifier identifies that resampling is not performed on the current frame.

According to the first aspect or any implementation of the first aspect, a standard syntax element that is used to identify the reference frame of the current frame and that is in the bitstream corresponding to the current frame is modified, where the standard syntax element is a syntax element specified in a standard coding protocol. In this way, a reference frame parameter (including the first identifier, the second identifier, the first indication information, the second indication information, the third identifier, the third indication information, and the resampling resolution) does not need to be added to the bitstream corresponding to the current frame. After receiving the bitstream corresponding to the current frame, a decoder may perform decoding in an existing decoding mode.

For example, the standard coding protocol may include but is not limited to H265, H264, H266, AV1, MPEG, and AVS-series coding protocols. This is not limited in this application.

According to the first aspect or any implementation of the first aspect, the standard syntax element that is used to identify the reference frame of the current frame includes at least one of the following:

a syntax element used to identify a quantity of long-term reference frames;

a syntax element used to identify a picture order count (Picture Order Count, POC) of a long-term reference frame;

a syntax element used to identify whether a long-term reference frame is used as a reference for the current frame;

a syntax element used to identify whether a negative reference frame is used;

a syntax element used to identify a quantity of negative reference frames;

a syntax element used to identify a distance between the current frame and a negative reference frame; and a syntax element used to identify whether a negative reference frame is used as a reference for the current frame.

For example, H265 is used as an example. The syntax element used to identify a quantity of long-term reference frames may be num_long_term_pics. The syntax element used to identify a POC of a long-term reference frame may be poc_lsb_lt[i] (poc_lsb_lt[i] indicates a POC of an $i^{th}$ long-term reference frame). The syntax element used to identify whether a long-term reference frame is used as a reference for the current frame may be: used_by_curr_pic_lt_flag[i] (used_by_curr_pic_lt_flag[i] indicates whether the $i^{th}$ long-term reference frame is used as the reference for the current frame).

For example, H265 is used as an example. The syntax element used to identify whether a negative reference frame is used may be short_term_ref_pic_set_sps_flag. The syntax element used to identify a quantity of negative reference frames may be num_negative_pics. The syntax element used to identify a distance between the current frame and a negative reference frame may be delta_poc_s0_minus1[i] (delta_poc_s0_minus1[i] indicates a distance between the current frame and an $i^{th}$ negative reference frame). The syntax element used to identify whether a negative reference frame is used as a reference for the current frame may be used_by_curr_pic_s0_flag[i] (used_by_curr_pic_s0_flag[i] indicates whether the $i^{th}$ negative reference frame is used as the reference for the current frame).

In addition, the standard syntax element that is used to identify the reference frame of the current frame may further include a syntax element pic_order_cnt_lsb used to identify a POC value of the current frame.

According to the first aspect or any implementation of the first aspect, the obtaining a reconstructed picture corresponding to a reference frame of the current frame from an external reference list of an encoder includes: determining whether a preset reference rule is satisfied; and determining reference indication information according to the preset reference rule when the preset reference rule is satisfied; and obtaining, based on the reference indication information, the reconstructed picture corresponding to the reference frame of the current frame from the external reference list of the encoder.

For example, determining whether the preset reference rule is satisfied may be determining whether the current frame satisfies the preset reference rule.

According to the first aspect or any implementation of the first aspect, the preset reference rule includes any one of the following: a long-term reference rule, a temporal layering reference rule, and a resampling reference rule.

According to the first aspect or any implementation of the first aspect, the long-term reference rule includes at least one of the following:

a reference period of a long-term reference frame is reached;

a bitstream corresponding to a preset reference frame of the current frame is lost; and a reconstructed picture whose similarity with the current frame is higher than a similarity threshold is present in the external reference list.

For example, that a reference period of a long-term reference frame is reached may mean that a distance difference from a frame that is closest to the current frame and that is encoded with reference to the long-term reference frame to the current frame reaches the reference period of the long-term reference frame.

For example, the temporal layering reference rule may be set based on a temporal layered structure.

For example, the resampling reference rule may include at least one of the following: a reference period of resampling is reached; and resampling is performed on a previous frame of the current frame. That a reference period of resampling is reached may mean that a distance difference from a frame that is closest to the current frame and that is encoded with reference to a resampled reference frame to the current frame reaches the reference period of resampling.

According to the first aspect or any implementation of the first aspect, the result of the intra coding includes an intra-coded reconstructed picture of the reconstructed picture corresponding to the reference frame of the current frame. The performing, by the encoder, inter coding on the current frame based on a result of the intra coding, to obtain a bitstream corresponding to the current frame includes: The encoder performs inter coding on the current frame by using an intra-coded reconstructed picture as a reference, to obtain the bitstream corresponding to the current frame.

According to the first aspect or any implementation of the first aspect, the reference frame of the current frame is a long-term reference frame, a temporal layered reference frame, or a resampled reference frame.

According to the first aspect or any implementation of the first aspect, the encoder is a hardware encoder.

According to a second aspect, an embodiment of this application provides a decoding method. The method includes: receiving a bitstream corresponding to a current frame; determining a reconstructed picture corresponding to a reference frame of the current frame from an external reference list of a decoder, where the reference frame of the current frame is a frame decoded by the decoder, and the external reference list is independent of the decoder; performing intra coding on the reconstructed picture, to obtain a corresponding intra-coded bitstream; performing, by the decoder, intra decoding on the intra-coded bitstream; and performing, by the decoder based on a result of the intra decoding, inter decoding on the bitstream corresponding to the current frame, to obtain a reconstructed picture of the current frame. In this way, the decoder may flexibly select a reference frame from the external reference list for decoding, so that the decoder can implement cross-frame reference decoding or cross-resolution reference decoding, thereby improving flexibility of reference frame management of a hardware decoder. In addition, the decoder collaborates with the encoder, to ensure video smoothness when a network condition in an RTC scene deteriorates.

For example, the decoder may include a decoder with flexible reference frame management, or may include a decoder with inflexible reference frame management. This is not limited in this application.

For example, intra decoding may be performed on the reconstructed picture corresponding to the reference frame of the current frame by using a quantization parameter less than a first preset threshold. The first preset threshold may be set as required. For example, the first preset threshold is a number less than 10, for example, 2, 3, 4, 5, 6, 7, 8, or 9. This is not limited in this application. In this way, high-quality intra decoding can be performed on the reconstructed picture corresponding to the reference frame of the current frame, thereby improving quality of a decoded picture of the current frame.

For example, intra decoding may be performed, at a bit rate greater than a second preset threshold, on the reconstructed picture corresponding to the reference frame of the current frame. The second preset threshold may be set as required. This is not limited in this application. In this way, high-quality intra decoding can also be performed on the reconstructed picture corresponding to the reference frame of the current frame, thereby improving decoding quality of the current frame.

For example, there may be a plurality of encoding and decoding scenarios corresponding to the decoding method provided in this application, for example, a scenario in which a long-term reference frame is used for decoding, a scenario in which a temporal layered reference frame is used for decoding, and a scenario in which a resampled reference frame is used for decoding. This is not limited in this application.

It should be noted that the decoding method in this application may be a method for decoding a predictive frame (Predictive frame, P frame).

According to the second aspect, the method further includes: when it is determined that the current frame needs to be used as a reference frame for subsequent decoding, adding the reconstructed picture of the current frame to the external reference list. In this way, a frame following the current frame can obtain the reconstructed picture of the reference frame from the external reference list.

According to the second aspect or any implementation of the second aspect, the adding the reconstructed picture of the current frame to the external reference list includes: resampling the reconstructed picture of the current frame; and adding a resampled reconstructed picture to the external reference list. In this way, a reconstructed picture corresponding to a resampled reference frame may be added to the external reference list, so as to facilitate subsequent encoding based on the resampled reference frame.

According to the second aspect or any implementation of the second aspect, the determining a reconstructed picture corresponding to a reference frame of the current frame from an external reference list of a decoder includes: parsing the bitstream corresponding to the current frame, to obtain a reference frame parameter; and determining, based on the reference frame parameter, the reconstructed picture corresponding to the reference frame of the current frame from the external reference list of the decoder.

According to the second aspect or any implementation of the second aspect, the reference frame parameter includes a first identifier and first indication information. The first identifier identifies whether the current frame is decoded based on the external reference list, and the first indication information indicates the reconstructed picture corresponding to the reference frame of the current frame in the external reference list.

For example, the reference frame parameter may alternatively include only the first identifier. In this case, the first identifier indicates that the current frame is not decoded based on the external reference list.

According to the second aspect or any implementation of the second aspect, the reference frame parameter includes a second identifier and second indication information. The second identifier identifies whether the current frame is used as a reference frame for subsequent decoding, and the second indication information indicates the reconstructed picture of the current frame in the external reference list.

For example, the reference frame parameter may alternatively include only the second identifier. In this case, the second identifier indicates that the current frame is not used as the reference frame for subsequent decoding.

According to the second aspect or any implementation of the second aspect, the bitstream corresponding to the current frame includes a third identifier, third indication information, and a resampling resolution. The third identifier identifies whether resampling is performed on the current frame, the third indication information indicates the resampled reconstructed picture of the current frame in the external reference list, and the resampling resolution includes a resolution corresponding to the reconstructed picture of the current frame and a resolution corresponding to the resampled reconstructed picture.

For example, the reference frame parameter may alternatively include only the third identifier. In this case, the third identifier indicates that resampling is not performed on the current frame.

According to the second aspect or any implementation of the second aspect, the reference frame of the current frame is a long-term reference frame, a temporal layered reference frame, or a resampled reference frame.

The second aspect and any implementation of the second aspect correspond to the first aspect and any implementation of the first aspect, respectively. For technical effects corresponding to the second aspect and any implementation of the second aspect, refer to the technical effects corresponding to the first aspect and any implementation of the first aspect. Details are not described herein again.

According to a third aspect, an embodiment of this application provides an encoding method. The method includes: obtaining a current frame; and when it is determined that encoding needs to be performed by a first encoder, encoding, by the first encoder, the current frame, to obtain a bitstream corresponding to the current frame; and adding a reconstructed picture generated based on the bitstream corresponding to the current frame to an external reference list of a second encoder, where the external reference list is independent of the second encoder; or when it is determined that encoding needs to be performed by the second encoder, determining a reconstructed picture corresponding to a reference frame of the current frame from the external reference list; and encoding, by the second encoder, the current frame based on the reconstructed picture corresponding to the reference frame of the current frame, to obtain the bitstream corresponding to the current frame. The first encoder is a hardware encoder, and the second encoder is a software encoder. In this way, a reference frame management capability of the hardware encoder is improved in a manner of combining the hardware encoder and the software encoder. Therefore, cross-frame reference or cross-resolution reference can be implemented, and flexibility of managing a reference frame for the encoder is improved. This can improve a poor capability of the encoder in a case of a weak network, and ensure video smoothness when a network condition in an RTC scene deteriorates.

According to the third aspect, the method further includes: determining whether the current frame is at a layer T0 in a temporal layered structure; and when the current frame is at the layer T0 in the temporal layered structure, determining that encoding needs to be performed by the first encoder; or when the current frame is not at the layer T0 in the temporal layered structure, determining that encoding needs to be performed by the second encoder.

For example, the layer T0 is a lowest layer of the temporal layered structure, and may also be referred to as a basic layer; and another layer may be referred to as an enhancement layer.

According to the third aspect or any implementation of the third aspect, the bitstream corresponding to the current frame includes a first identifier and first indication information. The first identifier identifies whether the current frame is encoded based on the external reference list, and the first indication information indicates the reconstructed picture corresponding to the reference frame of the current frame in the external reference list.

For example, the bitstream corresponding to the current frame may alternatively include only the first identifier. In this case, the first identifier indicates that the current frame is not encoded based on the external reference list.

According to a fourth aspect, an embodiment of this application provides a decoding method. The method includes: receiving a bitstream corresponding to a current frame; and when it is determined that decoding needs to be performed by a first decoder, decoding, by the first decoder, the bitstream corresponding to the current frame, to obtain a reconstructed picture of the current frame; and adding the reconstructed picture of the current frame to an external reference list of a second decoder, where the external reference list is located outside a second encoder; or when it is determined that decoding needs to be performed by the second decoder, determining a reconstructed picture corresponding to a reference frame of the current frame from the external reference list; and decoding, by the second decoder based on the reconstructed picture corresponding to the reference frame, the bitstream corresponding to the current frame, to obtain the reconstructed picture of the current frame. In this way, the bitstream is decoded in a manner of combining the first decoder and the second decoder. When the first decoder is a hardware decoder and the second decoder is a software decoder, flexibility of managing a reference frame for the hardware decoder can be enhanced.

According to the fourth aspect, the method further includes: parsing the bitstream corresponding to the current frame, to obtain a reference frame parameter; and determining, based on the reference frame parameter, whether decoding needs to be performed by the first decoder.

According to the fourth aspect or any implementation of the fourth aspect, the reference frame parameter includes a first identifier and first indication information. The first identifier identifies whether the current frame is decoded based on the external reference list, and the first indication information indicates the reconstructed picture corresponding to the reference frame of the current frame in the external reference list.

For example, the reference frame parameter may alternatively include only the first identifier. In this case, the first identifier indicates that the current frame is not decoded based on the external reference list.

According to the fourth aspect or any implementation of the fourth aspect, the determining a reconstructed picture corresponding to a reference frame of the current frame from the external reference list includes: when a value of the first identifier is first preset information, determining, as the reconstructed picture corresponding to the reference frame of the current frame, a reconstructed picture that matches the first indication information and that is in the external reference list.

According to the fourth aspect or any implementation of the fourth aspect, both the first decoder and the second decoder are software decoders.

According to the fourth aspect or any implementation of the fourth aspect, the first decoder is a hardware decoder, and the second decoder is a software decoder.

According to a fifth aspect, an embodiment of this application provides an electronic device, including a memory and a processor. The memory is coupled to the processor; and the memory stores program instructions. When the program instructions are executed by the processor, the electronic device is enabled to perform the encoding method according to the first aspect or any possible implementation of the first aspect.

The fifth aspect and any implementation of the fifth aspect correspond to the first aspect and any implementation of the first aspect, respectively. For technical effects corresponding to the fifth aspect and any implementation of the fifth aspect, refer to the technical effects corresponding to the first aspect and any implementation of the first aspect. Details are not described herein again.

According to a sixth aspect, an embodiment of this application provides an electronic device, including a memory and a processor. The memory is coupled to the processor; and the memory stores program instructions. When the program instructions are executed by the processor, the electronic device is enabled to perform the decoding method according to the second aspect or any possible implementation of the second aspect.

The sixth aspect and any implementation of the sixth aspect correspond to the second aspect and any implementation of the second aspect, respectively. For technical effects corresponding to the sixth aspect and any implementation of the sixth aspect, refer to the technical effects corresponding to the second aspect and any implementation of the second aspect. Details are not described herein again.

According to a seventh aspect, an embodiment of this application provides an electronic device, including a memory and a processor. The memory is coupled to the processor; and the memory stores program instructions. When the program instructions are executed by the processor, the electronic device is enabled to perform the encoding method according to the third aspect or any possible implementation of the third aspect.

The seventh aspect and any implementation of the seventh aspect correspond to the third aspect and any implementation of the third aspect, respectively. For technical effects corresponding to the seventh aspect and any implementation of the seventh aspect, refer to the technical effects corresponding to the third aspect and any implementation of the third aspect. Details are not described herein again.

According to an eighth aspect, an embodiment of this application provides an electronic device, including a memory and a processor. The memory is coupled to the processor; and the memory stores program instructions. When the program instructions are executed by the processor, the electronic device is enabled to perform the decoding method according to the fourth aspect or any possible implementation of the fourth aspect.

The eighth aspect and any implementation of the eighth aspect correspond to the fourth aspect and any implementation of the fourth aspect, respectively. For technical effects corresponding to the eighth aspect and any implementation of the eighth aspect, refer to the technical effects corresponding to the fourth aspect and any implementation of the fourth aspect. Details are not described herein again.

According to a ninth aspect, an embodiment of this application provides a chip, including one or more interface circuits and one or more processors. The interface circuit is configured to receive a signal from a memory of an electronic device, and send the signal to the processor, where the signal includes computer instructions stored in the memory. When the processor executes the computer instructions, the electronic device performs the encoding method according to the first aspect or any possible implementation of the first aspect.

The ninth aspect and any implementation of the ninth aspect correspond to the first aspect and any implementation of the first aspect, respectively. For technical effects corresponding to the ninth aspect and any implementation of the ninth aspect, refer to the technical effects corresponding to the first aspect and any implementation of the first aspect. Details are not described herein again.

According to a tenth aspect, an embodiment of this application provides a chip, including one or more interface circuits and one or more processors. The interface circuit is configured to receive a signal from a memory of an electronic device, and send the signal to the processor, where the signal includes computer instructions stored in the memory. When the processor executes the computer instructions, the electronic device performs the decoding method according to the second aspect or any possible implementation of the second aspect.

The tenth aspect and any implementation of the tenth aspect correspond to the second aspect and any implementation of the second aspect, respectively. For technical effects corresponding to the tenth aspect and any implementation of the tenth aspect, refer to the technical effects corresponding to the second aspect and any implementation of the second aspect. Details are not described herein again.

According to an eleventh aspect, an embodiment of this application provides a chip, including one or more interface circuits and one or more processors. The interface circuit is configured to receive a signal from a memory of an electronic device, and send the signal to the processor, where the signal includes computer instructions stored in the memory. When the processor executes the computer instructions, the electronic device performs the encoding method according to the third aspect or any possible implementation of the third aspect.

The eleventh aspect and any implementation of the eleventh aspect correspond to the third aspect and any implementation of the third aspect, respectively. For technical effects corresponding to the eleventh aspect and any implementation of the eleventh aspect, refer to the technical effects corresponding to the third aspect and any implementation of the third aspect. Details are not described herein again.

According to a twelfth aspect, an embodiment of this application provides a chip, including one or more interface circuits and one or more processors. The interface circuit is configured to receive a signal from a memory of an electronic device, and send the signal to the processor, where the signal includes computer instructions stored in the memory. When the processor executes the computer instructions, the electronic device performs the decoding method according to the fourth aspect or any possible implementation of the fourth aspect.

The twelfth aspect and any implementation of the twelfth aspect correspond to the fourth aspect and any implementation of the fourth aspect, respectively. For technical effects corresponding to the twelfth aspect and any implementation of the twelfth aspect, refer to the technical effects corresponding to the fourth aspect and any implementation of the fourth aspect. Details are not described herein again.

According to a thirteenth aspect, an embodiment of this application provides a computer-readable storage medium.

The computer-readable storage medium stores a computer program. When the computer program is run on a computer or a processor, the computer or the processor is enabled to perform the encoding method according to the first aspect or any possible implementation of the first aspect.

The thirteenth aspect and any implementation of the thirteenth aspect correspond to the first aspect and any implementation of the first aspect, respectively. For technical effects corresponding to the thirteenth aspect and any implementation of the thirteenth aspect, refer to the technical effects corresponding to the first aspect and any implementation of the first aspect. Details are not described herein again.

According to a fourteenth aspect, an embodiment of this application provides a computer-readable storage medium. The computer-readable storage medium stores a computer program. When the computer program is run on a computer or a processor, the computer or the processor is enabled to perform the decoding method according to the second aspect or any possible implementation of the second aspect.

The fourteenth aspect and any implementation of the fourteenth aspect correspond to the second aspect and any implementation of the second aspect, respectively. For technical effects corresponding to the fourteenth aspect and any implementation of the fourteenth aspect, refer to the technical effects corresponding to the second aspect and any implementation of the second aspect. Details are not described herein again.

According to a fifteenth aspect, an embodiment of this application provides a computer-readable storage medium. The computer-readable storage medium stores a computer program. When the computer program is run on a computer or a processor, the computer or the processor is enabled to perform the encoding method according to the third aspect or any possible implementation of the third aspect.

The fifteenth aspect and any implementation of the fifteenth aspect correspond to the third aspect and any implementation of the third aspect, respectively. For technical effects corresponding to the fifteenth aspect and any implementation of the fifteenth aspect, refer to the technical effects corresponding to the third aspect and any implementation of the third aspect. Details are not described herein again.

According to a sixteenth aspect, an embodiment of this application provides a computer-readable storage medium. The computer-readable storage medium stores a computer program. When the computer program is run on a computer or a processor, the computer or the processor is enabled to perform the decoding method according to the fourth aspect or any possible implementation of the fourth aspect.

The sixteenth aspect and any implementation of the sixteenth aspect correspond to the fourth aspect and any implementation of the fourth aspect, respectively. For technical effects corresponding to the sixteenth aspect and any implementation of the sixteenth aspect, refer to the technical effects corresponding to the fourth aspect and any implementation of the fourth aspect. Details are not described herein again.

According to a seventeenth aspect, an embodiment of this application provides a computer program product. The computer program product includes a software program. When the software program is executed by a computer or a processor, the computer or the processor is enabled to perform the encoding method according to the first aspect or any possible implementation of the first aspect.

The seventeenth aspect and any implementation of the seventeenth aspect correspond to the first aspect and any implementation of the first aspect, respectively. For technical effects corresponding to the seventeenth aspect and any implementation of the seventeenth aspect, refer to the technical effects corresponding to the first aspect and any implementation of the first aspect. Details are not described herein again.

According to an eighteenth aspect, an embodiment of this application provides a computer program product. The computer program product includes a software program. When the software program is executed by a computer or a processor, the computer or the processor is enabled to perform the decoding method according to the second aspect or any possible implementation of the second aspect.

The eighteenth aspect and any implementation of the eighteenth aspect correspond to the second aspect and any implementation of the second aspect, respectively. For technical effects corresponding to the eighteenth aspect and any implementation of the eighteenth aspect, refer to the technical effects corresponding to the second aspect and any implementation of the second aspect. Details are not described herein again.

According to a nineteenth aspect, an embodiment of this application provides a computer program product. The computer program product includes a software program. When the software program is executed by a computer or a processor, the computer or the processor is enabled to perform the encoding method according to the third aspect or any possible implementation of the third aspect.

The nineteenth aspect and any implementation of the nineteenth aspect correspond to the third aspect and any implementation of the third aspect, respectively. For technical effects corresponding to the nineteenth aspect and any implementation of the nineteenth aspect, refer to the technical effects corresponding to the third aspect and any implementation of the third aspect. Details are not described herein again.

According to a twentieth aspect, an embodiment of this application provides a computer program product. The computer program product includes a software program. When the software program is executed by a computer or a processor, the computer or the processor is enabled to perform the decoding method according to the fourth aspect or any possible implementation of the fourth aspect.

The twentieth aspect and any implementation of the twentieth aspect correspond to the fourth aspect and any implementation of the fourth aspect, respectively. For technical effects corresponding to the twentieth aspect and any implementation of the twentieth aspect, refer to the technical effects corresponding to the fourth aspect and any implementation of the fourth aspect. Details are not described herein again.

According to a twenty-first aspect, an embodiment of this application provides an electronic device. The electronic device is configured to perform encoding, and may include an obtaining module and a processing module. The obtaining module may be configured to obtain a current frame. The obtaining module may be further configured to obtain a reconstructed picture corresponding to a reference frame of the current frame from an external reference list of an encoder, where the reference frame of the current frame is a frame encoded by the encoder, and the external reference list is independent of the encoder. The processing module is configured to invoke the encoder to perform intra coding on the reconstructed picture. The processing module is further configured to invoke the encoder to perform inter coding on the current frame based on a result of the intra coding, to obtain a bitstream corresponding to the current frame. The processing module may implement, for example, a function of a video encoding module in FIG. 1.

For example, the electronic device may further include a communication module. The communication module may be configured to communicate with another electronic device and communicate with modules inside the electronic device, for example, may be configured to send the bitstream corresponding to the current frame.

The electronic device may be configured to perform the encoding method according to the first aspect or any possible implementation of the first aspect.

The twenty-first aspect and any implementation of the twenty-first aspect correspond to the first aspect and any implementation of the first aspect, respectively. For technical effects corresponding to the twenty-first aspect and any implementation of the twenty-first aspect, refer to the technical effects corresponding to the first aspect and any implementation of the first aspect. Details are not described herein again.

According to a twenty-second aspect, an embodiment of this application provides an electronic device. The electronic device is configured to perform decoding, and may include a communication module and a processing module. The communication module may be configured to receive a bitstream corresponding to a current frame. The processing module is configured to determine a reconstructed picture corresponding to a reference frame of the current frame from an external reference list of a decoder, where the reference frame of the current frame is a frame decoded by the decoder, and the external reference list is independent of the decoder. The processing module is further configured to perform intra coding on the reconstructed picture, to obtain a corresponding intra-coded bitstream. The processing module is further configured to: invoke the decoder to perform intra decoding on the intra-coded bitstream; and invoke the decoder to perform, based on a result of the intra decoding, inter decoding on the bitstream corresponding to the current frame, to obtain a reconstructed picture of the current frame. The processing module may implement, for example, a function of a video decoding module in FIG. 1.

The electronic device may be configured to perform the decoding method according to the second aspect or any possible implementation of the second aspect.

The twenty-second aspect and any implementation of the twenty-second aspect correspond to the second aspect and any implementation of the second aspect, respectively. For technical effects corresponding to the twenty-second aspect and any implementation of the twenty-second aspect, refer to the technical effects corresponding to the second aspect and any implementation of the second aspect. Details are not described herein again.

According to a twenty-third aspect, an embodiment of this application provides an electronic device. The electronic device is configured to perform encoding, and may include an obtaining module and a processing module. The obtaining module may be configured to obtain a current frame. The processing module is configured to: when it is determined that encoding needs to be performed by a first encoder, invoke the first encoder to encode the current frame, to obtain a bitstream corresponding to the current frame; and add a reconstructed picture generated based on the bitstream corresponding to the current frame to an external reference list of a second encoder, where the external reference list is independent of the second encoder. The processing module is further configured to: when it is determined that encoding needs to be performed by the second encoder, determine a reconstructed picture corresponding to a reference frame of the current frame from the external reference list; and invoke the second encoder to encode the current frame based on the reconstructed picture corresponding to the reference frame of the current frame, to obtain the bitstream corresponding to the current frame. The first encoder is a hardware encoder, and the second encoder is a software encoder. The processing module may implement, for example, a function of a video encoding module in FIG. 1.

For example, the electronic device may further include a communication module. The communication module may be configured to communicate with another electronic device and communicate with modules inside the electronic device, for example, may be configured to send the bitstream corresponding to the current frame.

The electronic device may be configured to perform the encoding method according to the third aspect or any possible implementation of the third aspect.

The twenty-third aspect and any implementation of the twenty-third aspect correspond to the third aspect and any implementation of the third aspect, respectively. For technical effects corresponding to the twenty-third aspect and any implementation of the twenty-third aspect, refer to the technical effects corresponding to the third aspect and any implementation of the third aspect. Details are not described herein again.

According to a twenty-fourth aspect, an embodiment of this application provides an electronic device. The electronic device is configured to perform decoding, and may include a communication module and a processing module. The communication module may be configured to receive a bitstream corresponding to a current frame. The processing module is configured to: when it is determined that decoding needs to be performed by a first decoder, invoke the first decoder to decode the bitstream corresponding to the current frame, to obtain a reconstructed picture of the current frame; and add the reconstructed picture of the current frame to an external reference list of a second decoder, where the external reference list is located outside a second encoder. The processing module is further configured to: when it is determined that decoding needs to be performed by the second decoder, determine a reconstructed picture corresponding to a reference frame of the current frame from the external reference list; and invoke the second decoder to decode, based on the reconstructed picture corresponding to the reference frame, the bitstream corresponding to the current frame, to obtain the reconstructed picture of the current frame. The processing module may implement, for example, a function of a video decoding module in FIG. 1.

The electronic device may be configured to perform the decoding method according to the fourth aspect or any possible implementation of the fourth aspect.

The twenty-fourth aspect and any implementation of the twenty-fourth aspect correspond to the fourth aspect and any implementation of the fourth aspect, respectively. For technical effects corresponding to the twenty-fourth aspect and any implementation of the twenty-fourth aspect, refer to the technical effects corresponding to the fourth aspect and any implementation of the fourth aspect. Details are not described herein again.

According to a twenty-fifth aspect, this application provides a bitstream. The bitstream is obtained by using the encoding method according to the first aspect or any possible implementation of the first aspect. Optionally, the bitstream may be stored in a computer-readable storage medium, or transmitted in a form of an electromagnetic signal.

The twenty-fifth aspect and any implementation of the twenty-fifth aspect correspond to the first aspect and any implementation of the first aspect, respectively. For technical effects corresponding to the twenty-fifth aspect and any implementation of the twenty-fifth aspect, refer to the technical effects corresponding to the first aspect and any implementation of the first aspect. Details are not described herein again.

According to a twenty-sixth aspect, this application provides a bitstream. The bitstream is obtained by using the encoding method according to the third aspect or any possible implementation of the third aspect. Optionally, the bitstream may be stored in a computer-readable storage medium, or transmitted in a form of an electromagnetic signal.

The twenty-sixth aspect and any implementation of the twenty-sixth aspect correspond to the third aspect and any implementation of the third aspect, respectively. For technical effects corresponding to the twenty-sixth aspect and any implementation of the twenty-sixth aspect, refer to the technical effects corresponding to the third aspect and any implementation of the third aspect. Details are not described herein again.

DESCRIPTION OF EMBODIMENTS

The following clearly describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and indicates that three relationships may exist. For example, A and/or B may indicate the following three cases: Only A exists, both A and B exist, and only B exists.

In the specification and claims in embodiments of this application, the terms "first", "second", and the like are intended to distinguish between different objects but do not indicate a particular order of the objects. For example, a first target object, a second target object, and the like are used for distinguishing between different target objects, but are not used for describing a specific order of the target objects.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the descriptions of embodiments of this application, unless otherwise specified, "a plurality of" means two or more. For example, a plurality of processing units mean two or more processing units, and a plurality of systems mean two or more systems.

Figure 1:
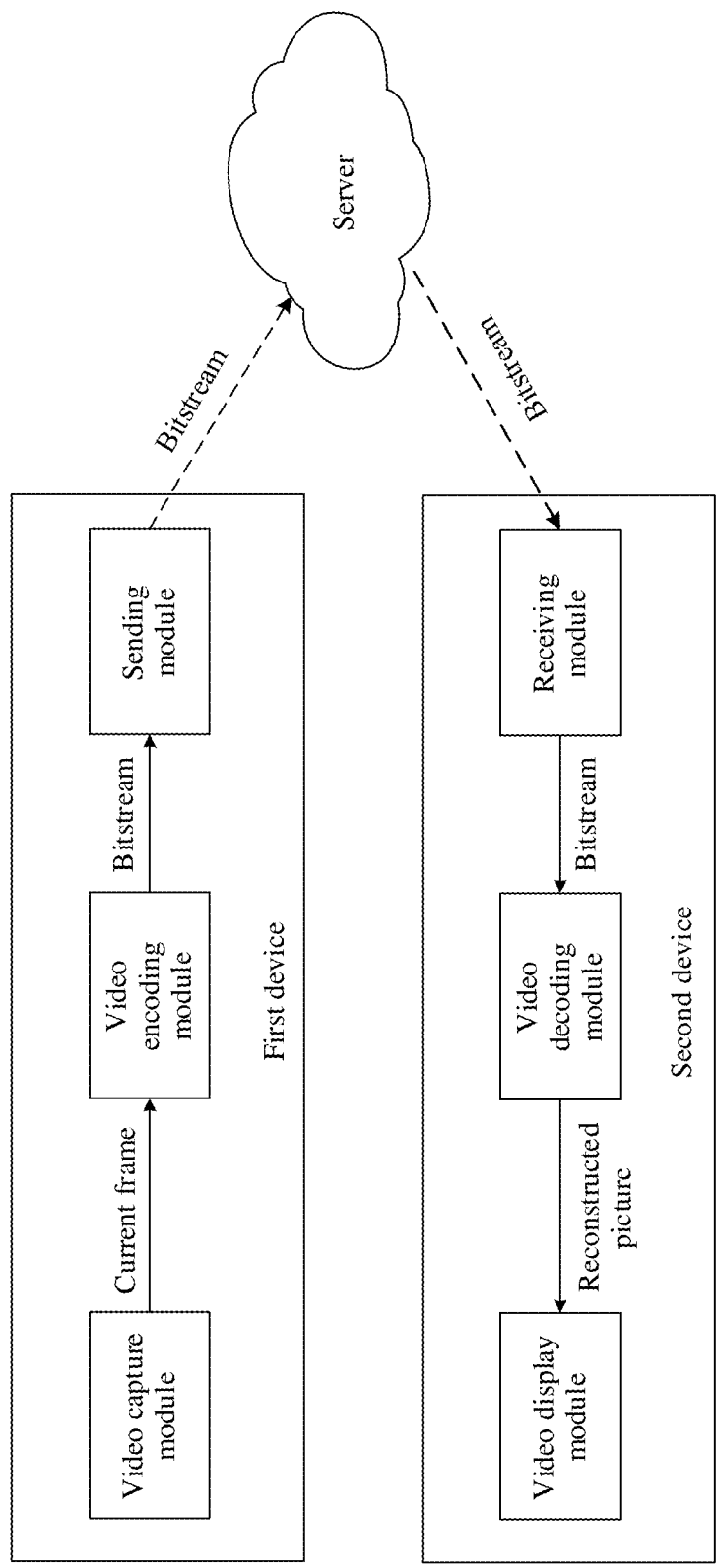
FIG. 1 is a diagram of an example of an application scenario.

FIG. 1 is a diagram of an example of an application scenario. An application scenario in FIG. 1 includes but is not limited to: various RTC video scenes such as video calling, screen content sharing (such as document sharing and video sharing), handwritten content sharing, video conference, short-distance projection, and live broadcast.

Refer to FIG. 1. For example, both a first device and a second device include but are not limited to a personal computer (Personal Computer, PC), a notebook computer, a tablet computer, and a mobile phone. This is not limited in this application. For example, a server may be a single server, or may be a server cluster. This is not limited in this application.

Refer to FIG. 1. For example, in an encoding process, a video capture module of the first device may perform video capture to obtain a current frame. For example, the video capture module includes but is not limited to a camera, a graphics card, or a screen recording tool. Then, the video capture module may send the captured current frame to a video encoding module, and the video encoding module performs video encoding on the current frame to obtain a bitstream corresponding to the current frame. Subsequently, the video encoding module sends the bitstream corresponding to the current frame to a sending module, and the sending module sends the bitstream corresponding to the current frame to the server.

For example, after receiving the bitstream corresponding to the current frame, the server forwards the bitstream corresponding to the current frame to the corresponding second device.

Still refer to FIG. 1. For example, in a decoding process, a receiving module of the second device receives the bitstream, and then sends the bitstream to a video decoding module, and the video decoding module decodes the bitstream to obtain a corresponding reconstructed picture.

Subsequently, the video decoding module sends the reconstructed picture to a video display module, and the video display module displays the reconstructed picture.

It should be understood that, after obtaining the bitstream through encoding, the first device may directly send the bitstream to the second device without forwarding the bitstream by the server. This is not limited in this application. In this application, an example in which the first device sends the bitstream obtained through encoding to the server, and the server forwards the bitstream to the second device is used for description.

It should be understood that the first device and the second device shown in FIG. 1 are merely examples, and the first device and the second device may have more or fewer components than those shown in the figure, a combination of two or more components, or a different component configuration. Various modules shown in FIG. 1 may be implemented in hardware including one or more signal processing and/or application-specific integrated circuits, software, or a combination of hardware and software.

For example, if the video encoding module in FIG. 1 is an encoder with a poor capability in a case of a weak network (for example, a hardware encoder, or another encoder generated with technology development), when a network condition in an RTC scene deteriorates, a case such as frame freezing or FPS drop occurs in a video of the second device. In this application, it is considered that one of reasons for a poor capability of a hardware encoder in a case of a weak network is that the hardware encoder does not include an external interface for reference frame management, and most hardware encoders perform encoding through frame-by-frame reference, that is, reference frame management of the hardware encoder is inflexible. Further, in this application, flexibility of reference frame management of the hardware encoder may be improved, to enhance the poor capability of the hardware encoder in a case of the weak network, thereby ensuring video smoothness when the network condition in the RTC scene deteriorates.

For example, the first device may create an external reference list independent of an encoder (that is, the external reference list is located outside the encoder to distinguish from a reference list managed inside the encoder). Subsequently, in an encoding process of the encoder, a reconstructed picture corresponding to a reference frame that is determined to be subsequently encoded and that is in an encoded frame is added to the external reference list. In this way, in a subsequent encoding process of the encoder, a reconstructed picture corresponding to an appropriate reference frame may be selected from the external reference list as a reference for encoding, so that the encoder can implement cross-frame reference encoding or cross-resolution reference encoding, thereby improving flexibility of reference frame management of the encoder. This can improve the poor capability of the encoder in a case of a weak network, and ensure video smoothness when a network condition in an RTC scene deteriorates.

The following describes an encoding process.

Figure 2:
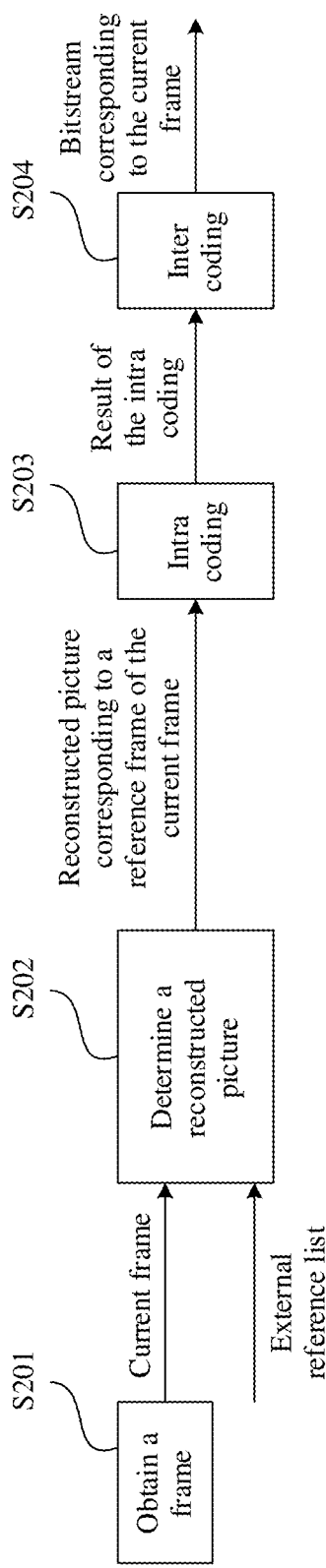
FIG. 2 is a diagram of an example of an encoding procedure.

FIG. 2 is a diagram of an example of an encoding procedure.

S201: Obtain a current frame.

For example, if a current application scenario is a video calling/video conference scene, the current frame obtained by a first device may be a picture of a person and/or an object.

For example, if a current application scenario is a screen content sharing/short-distance projection scene, the current frame obtained by a first device may be a document picture or a video picture displayed on a desktop.

For example, if a current application scenario is a handwritten content sharing scene, the current frame obtained by a first device may be a picture of a handwritten text/a hand-drawn graph.

S202: Obtain a reconstructed picture corresponding to a reference frame of the current frame from an external reference list of an encoder, where the reference frame of the current frame is a frame encoded by the encoder, and the external reference list is independent of the encoder.

For example, a preset reference frame setting rule may be preconfigured, and the preset reference frame setting rule may be used to determine whether the current frame needs to be set as a reference frame for subsequent encoding. Details are described subsequently. Further, each time a frame is encoded, the encoder may determine, according to the preset reference frame setting rule, whether the encoded frame needs to be used as a reference frame for subsequent encoding. When it is determined that the encoded frame needs to be used as the reference frame for subsequent encoding, a reconstructed picture corresponding to the encoded frame may be added to the external reference list as a reference for subsequent encoding of another frame. In this way, the external reference list may include a reconstructed picture corresponding to one or more encoded frames.

For example, a preset reference rule may be preconfigured, and the preset reference rule may include a reference determining rule and a reference frame determining rule. The reference determining rule is used to determine whether the current frame needs to be encoded with reference to the external reference list, and the reference frame determining rule is used to determine the reconstructed picture corresponding to the reference frame of the current frame in the external reference list. Further, after the current frame is obtained, it is determined whether the reference determining rule in the preset reference rule is satisfied.

For example, when it is determined that the reference determining rule is not satisfied, it may be determined that the current frame does not need to be encoded with reference to the external reference list. In this case, the current frame may be directly input to the encoder, and the encoder encodes the current frame, to obtain a bitstream corresponding to the current frame. For example, when the current frame is an intra frame (Intra frame, I frame), the encoder may perform intra coding on the current frame. When the current frame is a predictive frame (Predictive frame, P frame), the encoder may perform inter coding on the current frame. The encoder may perform inter coding on the current frame based on a reconstructed picture corresponding to a previous frame of the current frame, to obtain the bitstream corresponding to the current frame.

For example, when it is determined that the reference determining rule is satisfied, reference indication information may be determined according to the reference frame determining rule in the preset reference rule. The reference indication information indicates the reconstructed picture corresponding to the reference frame of the current frame in the external reference list. In this way, the reconstructed picture corresponding to the reference frame of the current frame may be obtained from the external reference list based on the reference indication information. Then, S203 and S204 may be performed, to encode the current frame.

S203: The encoder performs intra coding on the reconstructed picture.

S204: The encoder performs inter coding on the current frame based on a result of the intra coding, to obtain a bitstream corresponding to the current frame.

For example, for an encoder with inflexible reference frame management, the encoder usually performs inter coding through frame-by-frame reference. Therefore, the reconstructed picture corresponding to the reference frame of the current frame may be input to the encoder, and the encoder performs intra coding on the reconstructed picture corresponding to the reference frame of the current frame, to obtain a corresponding result of the intra coding. The result of the intra coding may include an intra-coded bitstream of the reconstructed picture corresponding to the reference frame of the current frame, and an intra-coded reconstructed picture of the reconstructed picture corresponding to the reference frame of the current frame.

In a possible manner, the encoder may perform, by using a quantization parameter less than a first preset threshold, intra coding on the reconstructed picture corresponding to the reference frame of the current frame. The first preset threshold may be set as required. For example, the first preset threshold is a number less than 10, for example, 2, 3, 4, 5, 6, 7, 8, or 9. This is not limited in this application. In this way, high-quality intra coding can be performed on the reconstructed picture corresponding to the reference frame of the current frame.

In a possible manner, the encoder may perform, at a bit rate greater than a second preset threshold, intra coding on the reconstructed picture corresponding to the reference frame of the current frame. The second preset threshold may be set as required. This is not limited in this application. In this way, high-quality intra coding can also be performed on the reconstructed picture corresponding to the reference frame of the current frame.

It should be noted that, a quantization parameter used by the encoder to perform intra coding on the reconstructed picture corresponding to the reference frame of the current frame may be less than a quantization parameter used by the encoder to perform intra coding on an I frame. For example, a bit rate at which the encoder performs intra coding on the reconstructed picture corresponding to the reference frame of the current frame may be greater than a bit rate at which the encoder performs intra coding on an I frame.

It should be noted that the first device does not send the intra-coded bitstream to a server/second device.

Then, after completing intra coding on the reconstructed picture corresponding to the reference frame of the current frame, the encoder may input the current frame to a hardware encoder. In this way, the encoder may perform inter coding on the current frame by using the intra-coded reconstructed picture as a reference, to obtain the bitstream corresponding to the current frame. For example, the first device may send the bitstream corresponding to the current frame to the server/second device.

In this way, the encoder may flexibly select a reference frame from the external reference list for encoding, thereby implementing cross-frame reference or cross-resolution reference, and improving flexibility of reference frame management of the encoder.

It should be noted that the encoder in this embodiment may include an encoder with inflexible reference frame management (for example, a hardware encoder, or another encoder generated with technology development), or may include an encoder with flexible reference frame management (for example, a software encoder, or another encoder generated with technology development). This is not limited in this application.

In a possible manner, the second device may also create an external reference list independent of a decoder (that is, the external reference list is located outside the decoder to distinguish from a reference list managed inside the decoder). Subsequently, in a decoding process of the decoder, a reconstructed picture corresponding to a reference frame that is determined to be subsequently decoded and that is in a decoded frame is added to the external reference list. In this way, in a subsequent decoding process of the decoder, a reconstructed picture corresponding to a matched reference frame may be selected from the external reference list as a reference for decoding, so that the decoder can implement cross-frame reference decoding or cross-resolution reference decoding, thereby improving flexibility of reference frame management of the decoder. In addition, the decoder collaborates with the encoder, to ensure video smoothness when a network condition in an RTC scene deteriorates.

Figure 3:
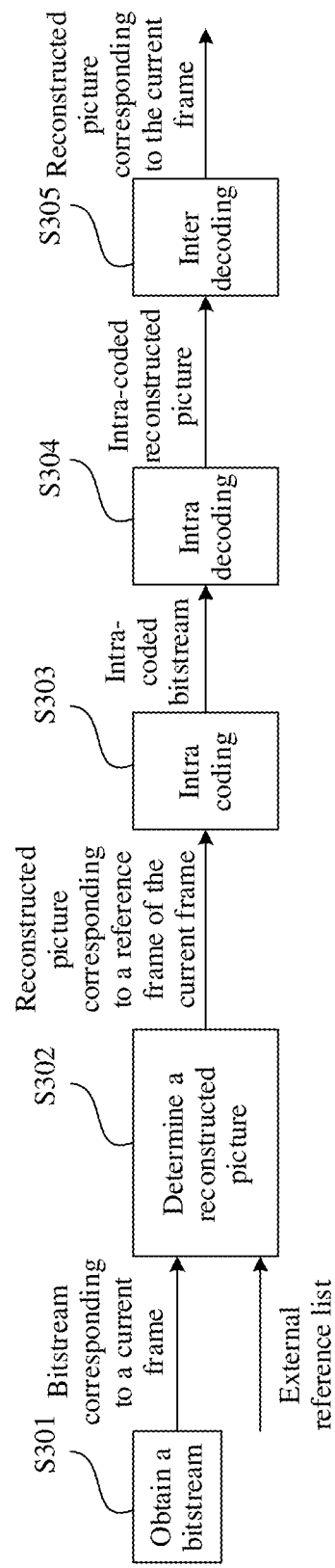
FIG. 3 is a diagram of an example of a decoding procedure.

FIG. 3 is a diagram of an example of a decoding procedure. A decoding process in the embodiment in FIG. 3 corresponds to the encoding process in the embodiment in FIG. 2.

S301: Receive a bitstream corresponding to a current frame.

S302: Determine a reconstructed picture corresponding to a reference frame of the current frame from an external reference list of a decoder, where the reference frame of the current frame is a frame decoded by the decoder, and the external reference list is independent of the decoder.

For example, after obtaining the bitstream corresponding to the current frame, in a possible manner, the first device may add a reference frame parameter of the current frame to the bitstream corresponding to the current frame. The reference frame parameter is used to describe an association between the current frame and the reconstructed picture corresponding to the reference frame in the external reference list. The reference frame parameter includes but is not limited to related description information about whether the current frame is used as a reference frame for subsequent encoding, related description information about whether the current frame is encoded with reference to an external reference list, and related description information about whether resampling is performed on the current frame. This is not limited in this application. Then, the bitstream to which the reference frame parameter is added is sent to a second device.

In this way, each time a frame is decoded, a decoder in the second device may determine, based on a reference frame parameter parsed out from a bitstream corresponding to the decoded frame, whether the decoded frame needs to be used as a reference frame. When it is determined that the decoded frame needs to be used as the reference frame, in a possible manner, a reconstructed picture corresponding to the decoded frame may be added to the external reference list. In this way, the external reference list includes a reconstructed picture of the reference frame. In a possible manner, a reconstructed picture corresponding to the decoded frame may be input to an encoder for intra coding, to obtain an intra-coded bitstream. Then, the intra-coded bitstream of the reconstructed picture corresponding to the decoded frame may be added to the external reference list. In this way, the external reference list includes an intra-coded bitstream of the reference frame. In this application, the external reference list including the reconstructed picture of the reference frame is used as an example for description.

In a possible manner, the encoder may perform, by using a quantization parameter less than a first preset threshold, intra coding on the reconstructed picture corresponding to the decoded frame, to obtain the intra-coded bitstream corresponding to the reconstructed picture of the decoded frame. The first preset threshold may be set as required. For example, the first preset threshold is a number less than 10, for example, 2, 3, 4, 5, 6, 7, 8, or 9. This is not limited in this application. In this way, high-quality intra coding can be performed on the reconstructed picture corresponding to the decoded frame.

In a possible manner, the encoder may perform, at a bit rate greater than a second preset threshold, intra coding on the reconstructed picture corresponding to the decoded frame, to obtain the intra-coded bitstream corresponding to the reconstructed picture corresponding to the decoded frame. The second preset threshold may be set as required. This is not limited in this application. In this way, high-quality intra coding can also be performed on the reconstructed picture corresponding to the decoded frame.

It should be noted that a quantization parameter used by the encoder to perform intra coding on the reconstructed picture corresponding to the decoded frame may be less than a quantization parameter used by the encoder to perform intra coding on an I frame. For example, a bit rate at which the encoder performs intra coding on the reconstructed picture corresponding to the decoded frame may be greater than a bit rate at which the encoder performs intra coding on an I frame.

For example, after the bitstream corresponding to the current frame is received, the bitstream corresponding to the current frame may be parsed, to obtain the reference frame parameter; and then the reconstructed picture corresponding to the reference frame of the current frame is determined from the external reference list of the decoder based on the reference frame parameter.

For example, whether the current frame needs to be decoded with reference to the external reference list may be determined based on the related description information about whether the current frame is encoded with reference to an external reference list in the reference frame parameter (for a decoder side, the description information is related description information about whether the current frame is decoded with reference to the external reference list).

For example, when it is determined that the current frame does not need to be decoded with reference to the external reference list, the bitstream corresponding to the current frame may be directly input to the decoder, and the decoder decodes the bitstream corresponding to the current frame, to obtain a corresponding reconstructed picture. For example, when the current frame is an I frame, the decoder may perform intra decoding on the bitstream corresponding to the current frame. When the current frame is a P frame, the decoder may perform inter decoding on the bitstream corresponding to the current frame. The decoder may perform, based on a reconstructed picture corresponding to a previous frame of the current frame, inter decoding on the bitstream corresponding to the current frame, to obtain a corresponding reconstructed picture.

For example, when it is determined that the current frame needs to be decoded with reference to the external reference list, the reconstructed picture corresponding to the reference frame of the current frame in the external reference list may be determined again based on the related description information about whether the current frame is decoded with reference to the external reference list in the reference frame parameter; and then S303 to S305 are performed.

S303: Perform intra coding on the reconstructed picture, to obtain a corresponding intra-coded bitstream.

S304: The decoder performs intra decoding on the intra-coded bitstream.

S305: The decoder performs, based on a result of the intra decoding, inter decoding on the bitstream corresponding to the current frame, to obtain a reconstructed picture of the current frame.

For example, the reconstructed picture, determined from the external reference list, corresponding to the reference frame of the current frame may be input to the encoder for intra coding, to obtain an intra-coded bitstream of the reconstructed picture corresponding to the reference frame of the current frame. Then, the intra-coded bitstream of the reconstructed picture corresponding to the reference frame of the current frame may be input to the decoder, and the decoder decodes the intra-coded bitstream, to obtain an intra-coded reconstructed picture of the reconstructed picture corresponding to the reference frame of the current frame. Then, the bitstream corresponding to the current frame is input to the decoder, and the decoder performs inter decoding on the bitstream corresponding to the current frame by using the intra-coded reconstructed picture as a reference, to obtain the reconstructed picture of the current frame.

A quantization parameter used by the encoder to perform intra coding on the reconstructed picture corresponding to the reference frame of the current frame may be less than the first preset threshold; or the encoder performs, at a bit rate greater than the second preset threshold, intra coding on the reconstructed picture corresponding to the reference frame of the current frame. For details, refer to the foregoing descriptions. Details are not described herein again.

It should be noted that, after the intra-coded reconstructed picture of the reconstructed picture corresponding to the reference frame of the current frame is obtained, the second device does not display the intra-coded reconstructed picture of the reconstructed picture corresponding to the reference frame of the current frame. After the reconstructed picture corresponding to the current frame is obtained, the reconstructed picture corresponding to the current frame is displayed.

In this way, the decoder may flexibly select a reference frame from the external reference list for decoding, so that the decoder can implement cross-frame reference encoding or cross-resolution reference decoding, thereby improving flexibility of reference frame management of a hardware decoder.

It should be noted that the decoder in this embodiment may include a decoder with inflexible reference frame management (for example, a hardware decoder, or another decoder generated with technology development), or may include a decoder with flexible reference frame management (for example, a software decoder, or another decoder generated with technology development). This is not limited in this application.

For example, after the bitstream corresponding to the current frame is obtained, in a possible manner, a standard syntax element that is used to identify the reference frame of the current frame and that is in the bitstream corresponding to the current frame may be modified, where the standard syntax element is a syntax element specified in a standard coding protocol. The standard coding protocol may include H265, H264, H266, AV1, MPEG, AVS series coding protocols, and the like. This is not limited in this application. A standard syntax element that needs to be modified is described subsequently. In this way, after receiving the bitstream, the decoder of the second device decodes the bitstream in an existing decoding mode. Details are not described herein again.

It should be noted that, when it is determined that the current frame does not need to be encoded with reference to a reference frame in the external reference list, and does not need to be used as a reference frame for subsequent encoding, a reference frame parameter may not need to be generated, and the bitstream corresponding to the current frame does not need to be modified. Subsequently, a corresponding to-be-encoded bitstream obtained by encoding the current frame is directly sent to a server or the second device.

For example, in the reference frame parameter, the related description information about whether the current frame is encoded with reference to an external reference list may include a first identifier and first indication information. The first identifier identifies whether the current frame is encoded based on the external reference list, or may identify whether the current frame is encoded with reference to a long-term reference frame, a temporal layered reference frame, or a resampled reference frame. The first indication information indicates the reconstructed picture corresponding to the reference frame of the current frame in the external reference list.

For example, in the reference frame parameter, the related description information about whether the current frame is used as a reference frame for subsequent encoding may include a second identifier and second indication information. For the second identifier and the second indication information, the second identifier identifies whether the current frame is used as the reference frame for subsequent encoding, and the second indication information indicates the reconstructed picture of the current frame in the external reference list.

For example, in the reference frame parameter, the related description information about whether resampling is performed on the current frame may include a third identifier, third indication information, and a resampling resolution. The third identifier identifies whether resampling is performed on the current frame, the third indication information indicates a resampled reconstructed picture of the current frame in the external reference list, and the resampling resolution includes a resolution corresponding to the reconstructed picture of the current frame and a resolution corresponding to the resampled reconstructed picture.

It should be understood that the reference frame parameter may further include another parameter, and is specifically determined as required. This is not limited in this application.

In a possible manner, the first identifier and the first indication information in the reference frame parameter may be added to the bitstream corresponding to the current frame.

In a possible manner, the second identifier and the second indication information in the reference frame parameter may be added to the bitstream corresponding to the current frame.

In a possible manner, the third identifier, the third indication information, and the resampling resolution in the reference frame parameter may be added to the bitstream corresponding to the current frame.

In a possible manner, the first identifier, the first indication information, the second identifier, and the second indication information in the reference frame parameter may be added to the bitstream corresponding to the current frame.

In a possible manner, the first identifier, the first indication information, the third identifier, the third indication information, and the resampling resolution in the reference frame parameter may be added to the bitstream corresponding to the current frame.

In a possible manner, at least one of the first identifier, the second identifier, and the third identifier in the reference frame parameter may be added to the bitstream corresponding to the current frame. In this case, the first identifier identifies that the current frame is not encoded based on the external reference list, the second identifier identifies that the current frame is not used as the reference frame for subsequent encoding, and the third identifier identifies that resampling is not performed on the current frame.

In a possible manner, the reference frame parameter of the current frame may be added to a parameter set (for example, a video parameter set (Video Parameter Set, VPS), a sequence parameter set (Sequence Parameter Set, SPS), or a picture parameter set (Picture Parameter Set, PPS)) in the bitstream corresponding to the current frame.

In a possible manner, in a process of encapsulating, according to a transmission protocol, the bitstream corresponding to the current frame, the reference frame parameter of the current frame is encapsulated into a header of a transmission protocol packet. For example, the reference frame parameter of the current frame is encapsulated in an extension header of a real-time transport protocol (Real-time Transport Protocol, RTP).

In a possible manner, in a process of encapsulating, according to a transmission protocol, the bitstream corresponding to the current frame, all reference frame parameters may be encapsulated as payload data.

In a possible manner, the bitstream corresponding to the current frame and the reference frame parameter may be packed into a file format (file format), and then the file format is encapsulated according to a transmission protocol. For example, the file format may include a file format formulated by the standard ISO14496-12. For example, if the file format is a file format formulated by the standard ISO14496-12, the reference frame parameter may be added to track header ( ), or a box ( ) corresponding to the reference frame parameter may be added. For example, a file may also be an MPEG2TS file format. It should be understood that a file format is not limited in this application.

For example, there may be a plurality of encoding and decoding scenarios corresponding to the encoding method and the decoding method provided in this application, for example, a scenario in which a long-term reference frame is used for encoding and decoding, a scenario in which a temporal layered reference frame is used for encoding and decoding, and a scenario in which a resampled reference frame is used for decoding. This is not limited in this application. The following separately describes encoding methods and decoding methods in the scenario in which a long-term reference frame is used for encoding and decoding, the scenario in which a temporal layered reference frame is used for encoding and decoding, and the scenario in which a resampled reference frame is used for encoding and decoding.

Figure 4:
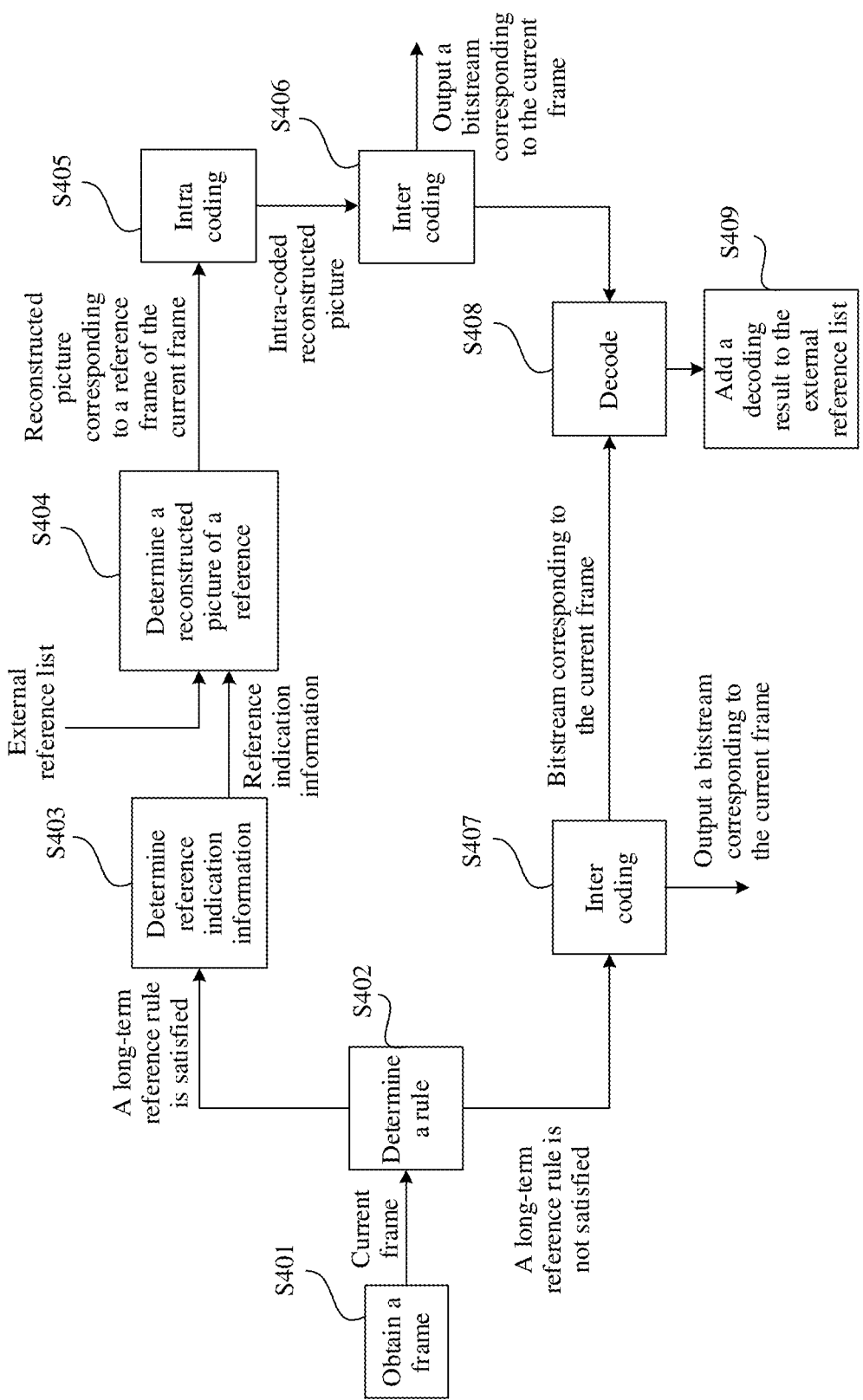
FIG. 4 is a diagram of an example of an encoding procedure.

FIG. 4 is a diagram of an example of an encoding procedure. In the embodiment in FIG. 4, a scenario in which a long-term reference frame is used for encoding is described. In the embodiment in FIG. 4, a preset reference rule is a long-term reference rule, and a preset reference frame setting rule is a long-term reference frame setting rule.

S401: Obtain a current frame.

S402: Determine whether the long-term reference rule is satisfied.

For example, the long-term reference rule may be set based on a reference period of a long-term reference frame, packet loss feedback information, an application scenario, and the like. This is not limited in this application. For example, the long-term reference rule may also include a reference determining rule and a reference frame determining rule. When it is determined that the reference determining rule in the long-term reference rule is satisfied, it may be determined that the long-term reference rule is satisfied. In this case, it may indicate that the current frame needs to be encoded with reference to a long-term reference frame, and S403 to S406 may be performed. When the reference determining rule in the long-term reference rule is not satisfied, it may be determined that the long-term reference rule is not satisfied. In this case, it may indicate that it is determined that the current frame does not need to be encoded with reference to a long-term reference frame, and S407 may be performed.

In a possible manner, the long-term reference rule is set based on the reference period of the long-term reference frame. For example, the reference determining rule in the long-term reference rule may be set as follows: The reference period of the long-term reference frame is reached (which may mean that a distance difference from a frame that is closest to the current frame and that is encoded with reference to the long-term reference frame to the current frame reaches the reference period of the long-term reference frame). The reference frame determining rule in the long-term reference rule may be set as follows: a long-term reference frame closest to the current frame in an external reference list. For example, the reference period of the long-term reference frame may be set as required, for example, five frames. This is not limited in this application. It is assumed that one group of picture (Group Of Picture, GOP) is used as an example. If the reference period of the long-term reference frame is 5, when the current frame is the fifth frame (picture order count (Picture Order Count, POC) =4) in the GOP, it may be determined that the reference period of the long-term reference frame is reached, and in this case, it may be determined that the long-term reference rule is satisfied.

In a possible manner, the long-term reference rule may be set based on the packet loss feedback information. For example, the reference determining rule in the long-term reference rule may be set as follows: A bitstream corresponding to a preset reference frame of the current frame is lost. The reference frame determining rule in the long-term reference rule may be set as follows: a long-term reference frame closest to the current frame in an external reference list. The preset reference frame may be a reference frame specified for the current frame in advance before the current frame is encoded. It is assumed that the current frame is the fifth frame (POC=4) in the GOP, and the preset reference frame of the current frame is the fourth frame (POC=3) in the GOP. If packet loss feedback information indicating that a bitstream of the fourth frame in the GOP is lost is received, it may be determined that the long-term reference rule is satisfied.

In a possible manner, the long-term reference rule may be set based on the application scenario. For example, the reference determining rule in the long-term reference rule may be set as follows: A current application scenario is a desktop sharing scene, and a reference frame whose similarity with the current frame is higher than a similarity threshold is present in an external reference list. The reference frame determining rule in the long-term reference rule may be set as follows: a long-term reference frame that is in the external reference list and has a highest similarity with the current frame. The similarity threshold may be set as required. This is not limited in this application.

S403: When it is determined that the long-term reference rule is satisfied, determine reference indication information according to the long-term reference rule.

For example, when any encoded frame is determined as a reference frame for subsequent encoding, a reconstructed picture corresponding to the encoded frame may be added to the external reference list, and a frame identifier is allocated to the reconstructed picture corresponding to the encoded frame. The frame identifier may uniquely identify a reconstructed picture in the external reference list, and may be determined as required, for example, a frame sequence number, a POC, or a presentation time stamp (Presentation Time Stamp, PTS). This is not limited in this application. In addition, an identifier that can uniquely specify the reconstructed picture corresponding to the encoded frame may be obtained through computing according to a preset computing rule (for example, a setting period of a long-term reference frame and a distance between the long-term reference frame and a nearest I frame).

In this way, when it is determined that the long-term reference rule is satisfied, a frame identifier of a reconstructed picture corresponding to a long-term reference frame of the current frame may be determined according to a reference frame determining rule in the long-term reference rule, and then the frame identifier is determined as the reference indication information.

For example, when the reference frame determining rule in the long-term reference rule is the long-term reference frame closest to the current frame in the external reference list, a frame identifier of a reconstructed picture corresponding to the long-term reference frame closest to the current frame in the external reference list may be used as the reference indication information. For another example, when the reference frame determining rule in the long-term reference rule is the long-term reference frame that is in the external reference list and that has a highest similarity with the current frame, a frame identifier of a reconstructed picture corresponding to the long-term reference frame that is in the external reference list and that has the highest similarity with the current frame may be used as the reference indication information.

S404: Obtain, based on the reference indication information, the reconstructed picture corresponding to the long-term reference frame of the current frame from an external reference list of an encoder.

For example, the reference indication information may be matched with a frame identifier of a reconstructed picture corresponding to each reference frame in the external reference list, to obtain the reconstructed picture corresponding to the long-term reference frame of the current frame from the external reference list of the encoder.

S405: The encoder performs intra coding on the reconstructed picture corresponding to the long-term reference frame of the current frame.

S406: The encoder performs inter coding on the current frame based on an intra-coded reconstructed picture of the reconstructed picture corresponding to the long-term reference frame of the current frame, to obtain a bitstream corresponding to the current frame.

For example, for S405 and S406, refer to the foregoing descriptions of S302 to S304. Details are not described herein again.

S407: When it is determined that the long-term reference rule is not satisfied, an encoder performs inter coding on the current frame based on a reconstructed picture corresponding to a previous frame of the current frame, to obtain a bitstream corresponding to the current frame.

For example, when it is determined that the long-term reference rule is not satisfied, that is, when it is determined that the current frame does not need to refer to the long-term reference frame, the current frame may be directly input to the encoder. Then, the encoder may perform inter coding on the current frame based on the reconstructed picture corresponding to the previous frame of the current frame, to obtain the bitstream corresponding to the current frame.

S408: When it is determined that the current frame needs to be used as a long-term reference frame for subsequent encoding, perform decoding based on the bitstream corresponding to the current frame, to generate a reconstructed picture of the current frame.

For example, the long-term reference frame setting rule may be set based on a setting period of a long-term reference frame, channel quality, an application scenario, and the like. This is not limited in this application. Further, after encoding of the current frame is completed, whether the current frame needs to be used as the long-term reference frame for subsequent encoding may be determined by determining whether the long-term reference frame setting rule is satisfied. When it is determined that the long-term reference frame setting rule is satisfied, it is determined that the current frame needs to be used as the long-term reference frame for subsequent encoding, and the reconstructed picture of the current frame may be added to the external reference list of the encoder. When it is determined that the long-term reference frame setting rule is not satisfied, it is determined that the current frame does not need to be used as the long-term reference frame for subsequent encoding. In this case, the encoding procedure may be ended.

In a possible manner, the long-term reference frame setting rule may be set based on the setting period of the long-term reference frame. For example, the long-term reference frame setting rule may be set as follows: The setting period of the long-term reference frame is reached (which may mean that a distance difference from a long-term reference frame closest to the current frame to the current frame reaches the setting period of the long-term reference frame). In a possible manner, the setting period of the long-term reference frame may be a preset fixed value, for example, 4. This is not limited in this application. It is assumed that one GOP is used as an example. If the setting period of the long-term reference frame is 4, when the current frame is the fourth frame (POC=3) in the GOP, it may be determined that the setting period of the long-term reference frame is reached. In this case, it may be determined that the long-term reference frame setting rule is satisfied, that is, it is determined that the current frame needs to be used as the long-term reference frame for subsequent encoding.

In a possible manner, the setting period of the long-term reference frame may be a dynamic value adjusted based on the channel quality. This is not limited in this application. For example, when it is detected that the channel quality is poor, if it is determined, based on packet loss feedback information, that bitstreams of four consecutive frames are successfully received, the setting period of the long-term reference frame may be adjusted to 4. If it is determined, based on packet loss feedback information, that bitstreams of three consecutive frames are successfully received, the setting period of the long-term reference frame may be adjusted to 3.

In a possible manner, the long-term reference frame setting rule may be set based on the channel quality. For example, the long-term reference frame setting rule may be set as follows: The channel quality is lower than a quality threshold. The quality threshold may be set as required. This is not limited in this application. For example, if it is detected that the channel quality is lower than the quality threshold, it may be determined that the long-term reference frame setting rule is satisfied, that is, it is determined that the current frame needs to be used as the long-term reference frame for subsequent encoding. If it is detected that the channel quality is higher than or equal to the quality threshold, it may be determined that the long-term reference frame setting rule is not satisfied, that is, it is determined that the current frame does not need to be used as the long-term reference frame for subsequent encoding.

In a possible manner, the long-term reference frame setting rule may be set based on the application scenario. For example, the long-term reference frame setting rule may be set as follows: The application scenario is a desktop sharing scene, and a difference from a previous frame is greater than a difference threshold. The difference threshold may be set as required. This is not limited in this application. For example, the difference threshold is 0.6. In the desktop sharing scene, when the difference between the current frame and the previous frame is greater than or equal to 0.6, it may be determined that the long-term reference frame setting rule is satisfied, that is, it is determined that the current frame needs to be used as the long-term reference frame for subsequent encoding. When the difference between the current frame and the previous frame is less than 0.6, it may be determined that the long-term reference frame setting rule is not satisfied, that is, it is determined that the current frame does not need to be used as the long-term reference frame for subsequent encoding.

S409: Add the reconstructed picture of the current frame to the external reference list.

For example, the reconstructed picture of the current frame may be added to the external reference list, and a corresponding frame identifier is set for the reconstructed picture of the current frame.

For example, after the bitstream corresponding to the current frame is obtained, a reference frame parameter may be added to the bitstream corresponding to the current frame. In the example in FIG. 4, in the reference frame parameter, a first identifier may identify whether the current frame is encoded with reference to the long-term reference frame, first indication information may indicate the reconstructed picture corresponding to the long-term reference frame of the current frame in the external reference list, a second identifier may identify whether the current frame is used as the long-term reference frame for subsequent encoding, and second indication information indicates the reconstructed picture of the current frame in the external reference list.

For example, after it is determined that the long-term reference rule is satisfied and the current frame is encoded based on the long-term reference frame in the external reference list, the first identifier may be assigned first preset information (for example, "A1"), and the first indication information is assigned the frame identifier corresponding to the reconstructed picture of the current frame in the external reference list. When it is not determined that the long-term reference rule is satisfied, the first identifier may be configured as second preset information (for example, "A0"), and "NULL" is assigned to the first indication information.

For example, after it is determined that the current frame needs to be used as the long-term reference frame for subsequent encoding and the reconstructed picture of the current frame is added to the external reference list, the second identifier may be configured as third preset information (for example, "B1"), and the second indication information is assigned the frame identifier corresponding to the reconstructed picture corresponding to the long-term reference frame of the current frame in the external reference list. When it is determined that the current frame does not need to be used as the long-term reference frame for subsequent encoding, the second identifier may be configured as fourth preset information (for example, "B0"), and "NULL" is assigned to the second indication information.

Figure 5A:
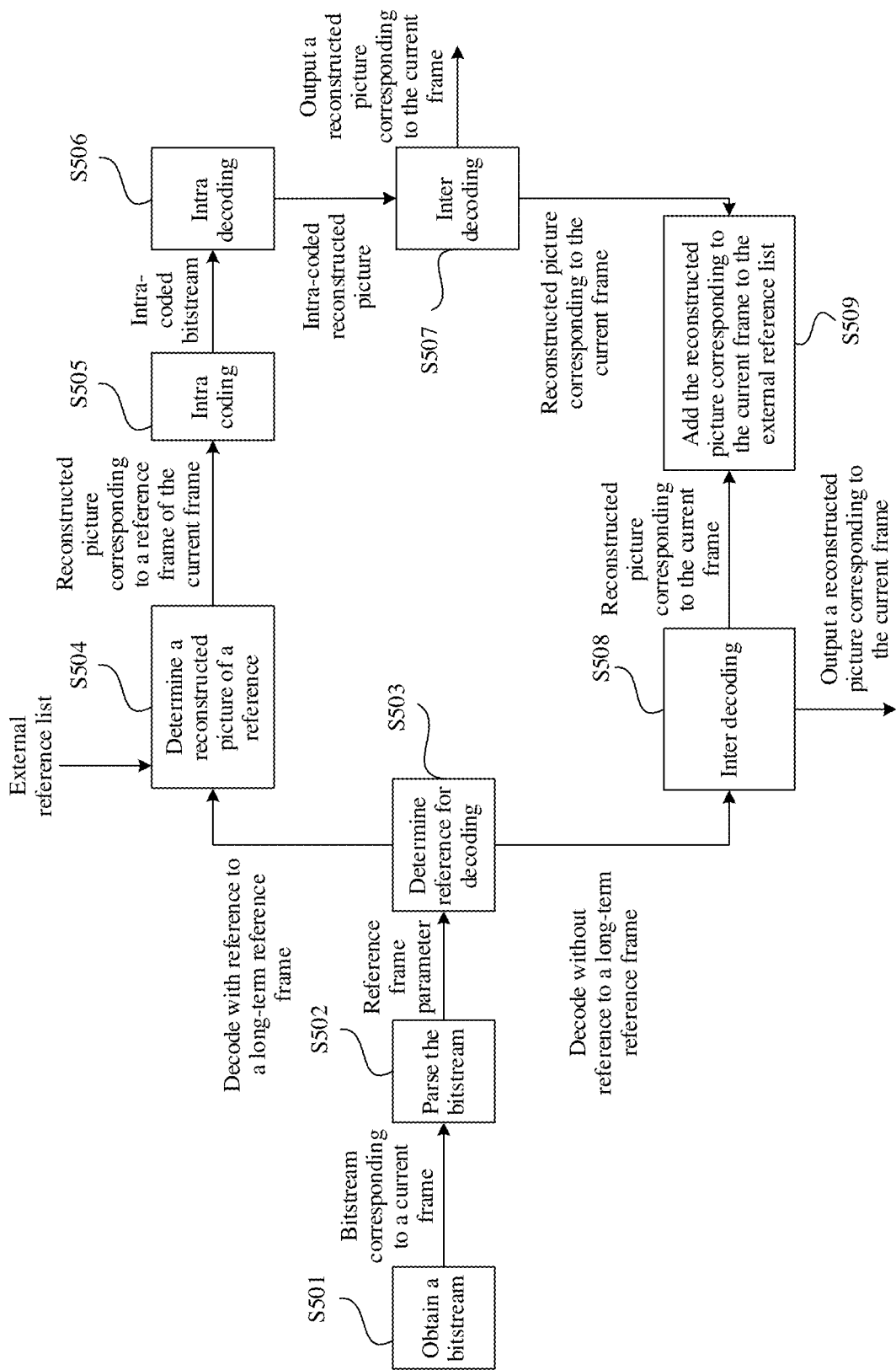
FIG. 5a is a diagram of an example of a decoding procedure.

FIG. 5a is a diagram of an example of a decoding procedure. In the embodiment in FIG. 5a, a scenario in which a long-term reference frame is used for decoding is described, and corresponds to the encoding process in the embodiment in FIG. 4.

S501: Receive a bitstream corresponding to a current frame.

S502: Parse the bitstream corresponding to the current frame, to obtain a reference frame parameter.

S503: Determine, based on the reference frame parameter, whether the current frame needs to be decoded with reference to a long-term reference frame.

For example, after the reference frame parameter is parsed out from the bitstream corresponding to the current frame, it may be determined whether a first identifier is present in the reference frame parameter. When the first identifier is present in the reference frame parameter, it is determined whether a value of the first identifier is first preset information. If the value of the first identifier is the first preset information, it is determined that the current frame needs to be decoded with reference to the long-term reference frame. In this case, S504 to S507 may be performed. If the value of the first identifier is second preset information, or the reference frame parameter does not include the first identifier, it is determined that the current frame does not need to be decoded with reference to the long-term reference frame. In this case, S508 may be performed.

S504: When it is determined that the current frame needs to be decoded with reference to the long-term reference frame, determine, based on the reference frame parameter, a reconstructed picture corresponding to a long-term reference frame of the current frame from an external reference list of a decoder, where a long-term reference frame in the external reference list is a decoded frame.

For example, when it is determined that the current frame needs to be decoded with reference to the long-term reference frame, a reconstructed picture that matches first indication information in the reference frame parameter is determined from the external reference list of the decoder as the reconstructed picture corresponding to the long-term reference frame of the current frame.

S505: Perform intra coding on the reconstructed picture, to obtain a corresponding intra-coded bitstream.

S506: The decoder performs intra decoding on the intra-coded bitstream.

S507: Based on an intra-coded reconstructed picture obtained by decoding the intra-coded bitstream, the decoder performs inter decoding on the bitstream corresponding to the current frame, to obtain a reconstructed picture of the current frame.

For example, for S505 to S507, refer to the foregoing descriptions of S303 to S305. Details are not described herein again.

S508: When it is determined that the current frame does not need to be decoded with reference to the long-term reference frame, a decoder performs, based on a reconstructed picture corresponding to a previous frame of the current frame, inter decoding on the bitstream corresponding to the current frame, to obtain a reconstructed picture of the current frame.

For example, when it is determined that the current frame does not need to be decoded with reference to the long-term reference frame, the bitstream corresponding to the current frame may be directly input to the decoder, and then the decoder may perform, based on the reconstructed picture corresponding to the previous frame of the current frame, inter decoding on the bitstream corresponding to the current frame, to obtain the reconstructed picture of the current frame.

For example, whether the current frame needs to be used as a long-term reference frame for subsequent decoding may be determined based on the reference frame parameter. For example, it may be determined whether the reference frame parameter includes a second identifier. When the reference frame parameter includes the second identifier, it may be determined whether a value of the second identifier is third preset information. When the value of the second identifier is the third preset information, it may be determined that the current frame needs to be used as the long-term reference frame for subsequent decoding. In this case, S509 may be performed. When the value of the second identifier is fourth preset information, or the reference frame parameter does not include the second identifier, it may be determined that the current frame does not need to be used as the long-term reference frame for subsequent decoding, and the decoding procedure may be ended.

S509: When it is determined that the current frame needs to be used as the long-term reference frame for subsequent decoding, add the reconstructed picture of the current frame to the external reference list.

For example, the reconstructed picture of the current frame may be added to the external reference list, and a corresponding frame identifier is set for the reconstructed picture of the current frame.

Certainly, intra coding may also be performed on the reconstructed picture of the current frame, to obtain an intra-coded bitstream corresponding to the reconstructed picture of the current frame; and then the intra-coded bitstream corresponding to the reconstructed picture of the current frame is added to the external reference list. For details, refer to the foregoing descriptions. Details are not described herein again.

Figure 5B:
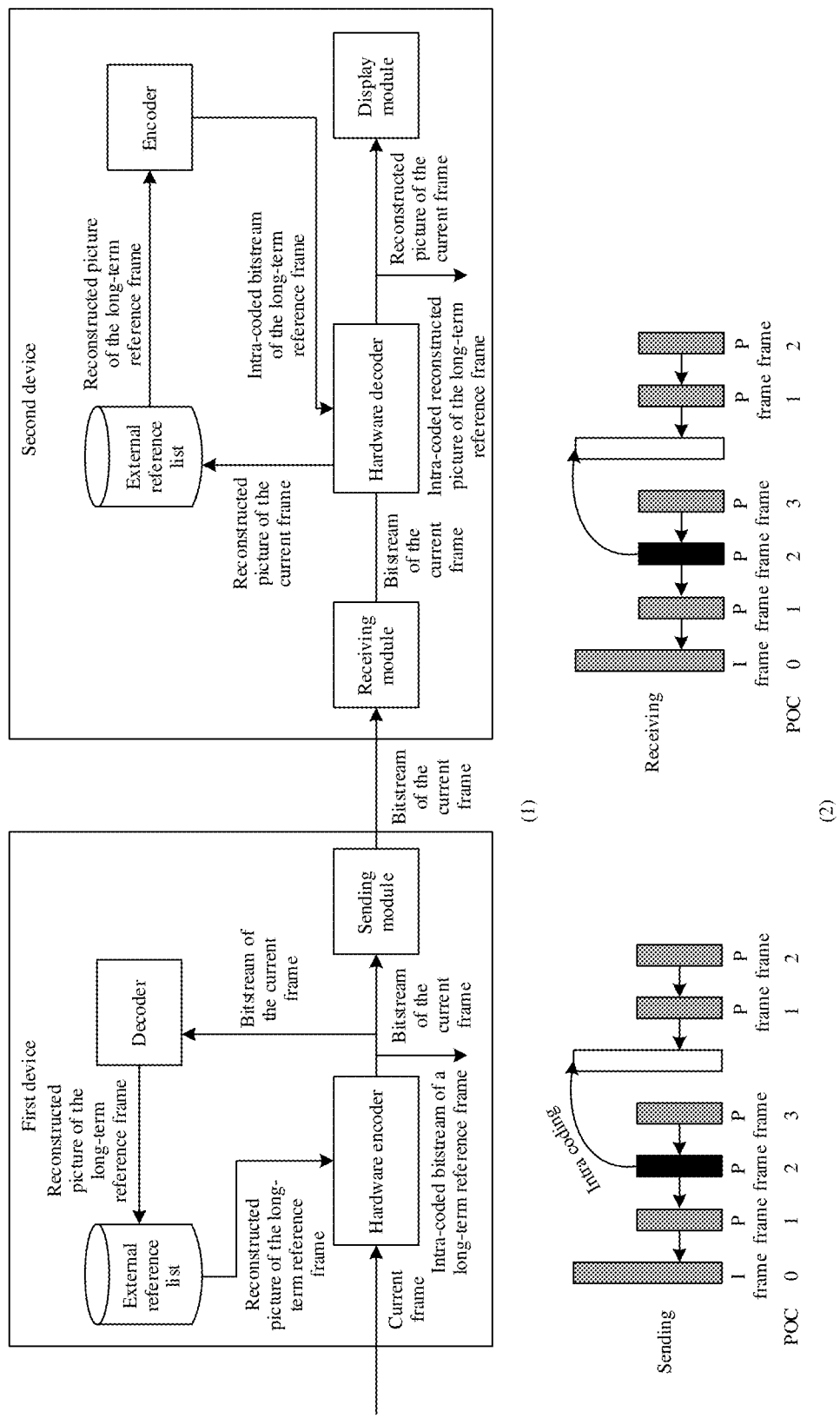
FIG. 5b is a diagram of an example of an encoding and decoding process.

FIG. 5b is a diagram of an example of an encoding and decoding process. In FIG. 5b(1), an encoder in a first device is a hardware encoder, and a decoder in a second device is a hardware decoder. In FIG. 5b(2), gray and black frames in a left area are frames sent by the first device, and gray and black frames in a right area are frames received by the second device. The black frame is a long-term reference frame.

With reference to FIG. 5b(1) and FIG. 5b(2), it is assumed that a to-be-encoded video sequence is IPPPPP, a long-term reference frame setting rule is as follows: A setting period of a long-term reference frame is reached, where the setting period of the long-term reference frame is 4; and a long-term reference rule is as follows: A reference period of a long-term reference frame is reached, where the reference period of the long-term reference frame is 5. In a process of encoding the video sequence, at a moment t0, when a current frame is an I frame, the hardware encoder may perform intra coding on the I frame to obtain a bitstream of the I frame, and then send the bitstream of the I frame to the second device. At a moment t1, a current frame is the first P frame, and the hardware encoder may encode the first P frame with reference to a reconstructed picture of the I frame to obtain a bitstream of the first P frame, and then send the bitstream of the first P frame to the second device. At a moment t2, a current frame is the second P frame, and the hardware encoder may encode the second P frame with reference to a reconstructed picture of the first P frame to obtain a bitstream of the second P frame, and then send the bitstream of the second P frame to the second device. At a moment t3, a current frame is the third P frame, and the hardware encoder may encode the third P frame with reference to a reconstructed picture of the second P frame to obtain a bitstream of the third P frame. Because the moment t3 reaches the setting period 4 of the long-term reference frame, the bitstream of the third P frame may be input to the decoder to obtain a reconstructed picture of the third P frame output by the decoder, and then the reconstructed picture of the third P frame is stored into an external reference list. Then, a second identifier may be added to the bitstream of the third P frame, the second identifier is assigned third preset information, second indication information (for example, 3) is added to the bitstream of the third P frame, and then the bitstream of the third P frame to which a reference frame parameter is added is sent to the second device. At a moment t4, a current frame is the fourth P frame. Because the reference period 5 of the long-term reference frame is reached at this time, the hardware encoder may obtain the reconstructed picture of the third P frame from the external reference list, and then, the hardware encoder may perform intra coding on the reconstructed picture of the third P frame, to obtain an intra-coded bitstream (not sent) of the reconstructed picture of the third P frame and an intra-coded reconstructed picture of the reconstructed picture of the third P frame. Then, the fourth P frame is input to the hardware encoder, and the hardware encoder encodes the fourth P frame with reference to the intra-coded reconstructed picture of the reconstructed picture of the third P frame, to obtain a bitstream of the fourth P frame. Then, a first identifier may be added to the bitstream of the fourth P frame, the first identifier is assigned first preset information, first indication information (for example, 3) is added to the bitstream of the fourth P frame, and then the bitstream of the fourth P frame to which the reference frame parameter is added is sent to the second device. At a moment t5, a current frame is the fifth P frame, and the hardware encoder may encode the fifth P frame with reference to a reconstructed picture of the fourth P frame to obtain a bitstream of the fifth P frame, and then send the bitstream of the fifth P frame to the second device.

With reference to FIG. 5b(1) and FIG. 5b(2), in a process of decoding the video sequence, at the moment t0, when a current frame is the I frame, the hardware decoder may perform intra decoding on the bitstream of the I frame to obtain the reconstructed picture of the I frame, and then send the reconstructed picture of the I frame to a display module for display. At the moment t1, a current frame is the first P frame, and the hardware decoder may decode the bitstream of the first P frame with reference to the reconstructed picture of the I frame to obtain the reconstructed picture of the first P frame, and then send the reconstructed picture of the first P frame to the display module. At the moment t2, a current frame is the second P frame, and the hardware decoder may decode the bitstream of the second P frame with reference to the reconstructed picture of the first P frame to obtain the reconstructed picture of the second P frame, and then send the reconstructed picture of the second P frame to the display module. At the moment t3, a current frame is the third P frame, and the hardware decoder may decode the bitstream of the third P frame with reference to the reconstructed picture of the second P frame to obtain the reconstructed picture of the third P frame, and then send the reconstructed picture of the third P frame to the display module. After the reconstructed picture of the third P frame output by the hardware decoder is obtained, the reconstructed picture of the third P frame may be stored into an external reference list based on the second identifier and the second indication information. At the moment t4, a current frame is the fourth P frame, and the reconstructed picture of the third P frame may be obtained from the external reference list based on the first identifier and the first indication information. Then, the reconstructed picture of the third P frame is input to the encoder, and the encoder may perform intra coding on the reconstructed picture of the third P frame, to obtain the intra-coded bitstream of the reconstructed picture of the third P frame. Then, the encoder sends the intra-coded bitstream of the reconstructed picture of the third P frame to the hardware decoder, and the hardware decoder may obtain, through decoding, the intra-decoded reconstructed picture (not sent) of the reconstructed picture of the third P frame. Then, the bitstream of the fourth P frame is input to the hardware decoder, and the hardware decoder decodes the bitstream of the fourth P frame based on the intra-decoded reconstructed picture of the reconstructed picture of the third P frame to obtain the reconstructed picture of the fourth P frame, and then send the reconstructed picture of the fourth P frame to the display module. At the moment t5, a current frame is the fifth P frame, and the hardware decoder may decode the bitstream of the fifth P frame with reference to the reconstructed picture of the fourth P frame to obtain a reconstructed picture of the fifth P frame, and then send the reconstructed picture of the fifth P frame to the display module.

In a possible manner, after the first device performs S401 to S408, a standard syntax element that is used to identify a reference frame of the current frame and that is in the bitstream corresponding to the current frame may be modified, where the standard syntax element is a syntax element specified in a standard coding protocol.

For example, after the first device performs S401 to S408, the standard syntax element that is used to identify the reference frame of the current frame and that needs to be modified includes at least one of the following: a syntax element used to identify a POC value of the current frame, a syntax element used to identify a quantity of long-term reference frames, a syntax element used to identify a picture order count POC of a long-term reference frame, and a syntax element used to identify whether a long-term reference frame is used as a reference for the current frame. Certainly, another standard syntax element that is used to identify the reference frame of the current frame may be further included. This is not limited in this application.

The coding protocol H265 is used as an example, the standard syntax element that is in the bitstream corresponding to the current frame and that is related to the reference frame of the current frame may be shown in Table 1.

TABLE 1

| Syntax element | Description |
| --- | --- |
| pic_order_cnt_lsb | Identify a POC value of a current frame |
| num_long_term_pics | Identify a quantity of long-term reference frames |

TABLE 1-continued

| Syntax element | Description |
| --- | --- |
| poc_lsb_lt[i] | Identify a POC of an i<sup>th</sup> long-term reference frame |
| used_by_curr_pic_lt_flag[i] | Identify whether the i<sup>th</sup> long-term reference frame is used as a reference for the current frame |

It should be understood that the syntax elements shown in Table 1 are merely some examples of the standard syntax element that is used to identify the reference frame of the current frame and that is in the bitstream corresponding to the current frame. In this application, the standard syntax element that is used to identify the reference frame of the current frame and that is in the bitstream corresponding to the current frame may have more or fewer syntax elements than those in Table 1. Details are not described herein again.

It is assumed that the current frame is the sixth frame (POC=5), and needs to be encoded with reference to the long-term reference frame. Before encoding the current frame, the encoder performs intra coding on a reconstructed picture corresponding to a reference frame of the current frame, and a POC in an obtained intra-coded bitstream is 0. Therefore, a POC in a bitstream obtained by encoding the current frame by the encoder is 1. To enable the decoder to perform decoding normally, a picture order count POC in the bitstream corresponding to the current frame may be modified to 5, that is, a value of pic_order_cnt_lsb is modified from 0 to 5, so that the POC in the bitstream corresponding to the current frame is continuous with a POC in a bitstream corresponding to the frame previous to the current frame.

It is assumed that the long-term reference frame of the current frame is the fourth frame. The external reference list includes two long-term reference frames, and the two long-term reference frames are the first frame (POC=0) and the fourth frame (POC=3). In this case, a value of num_long_term_pics may be modified from 0 to 2, a value of poc_lsb_lt[0] may be modified from "NULL" to 0, a value of poc_lsb_lt[1] may be modified from "NULL" to 3, a value of used_by_curr_pic_lt_flag[0] may be modified from "NULL" to 0, and a value of used_by_curr_pic_lt_flag[1] may be modified from "NULL" to 1. used_by_curr_pic_lt_flag[0]=0 indicates that the first frame is not used as a reference for the current frame, and used_by_curr_pic_lt_flag[1]=1 indicates that the fourth frame is used as a reference for the current frame.

Figure 5C:
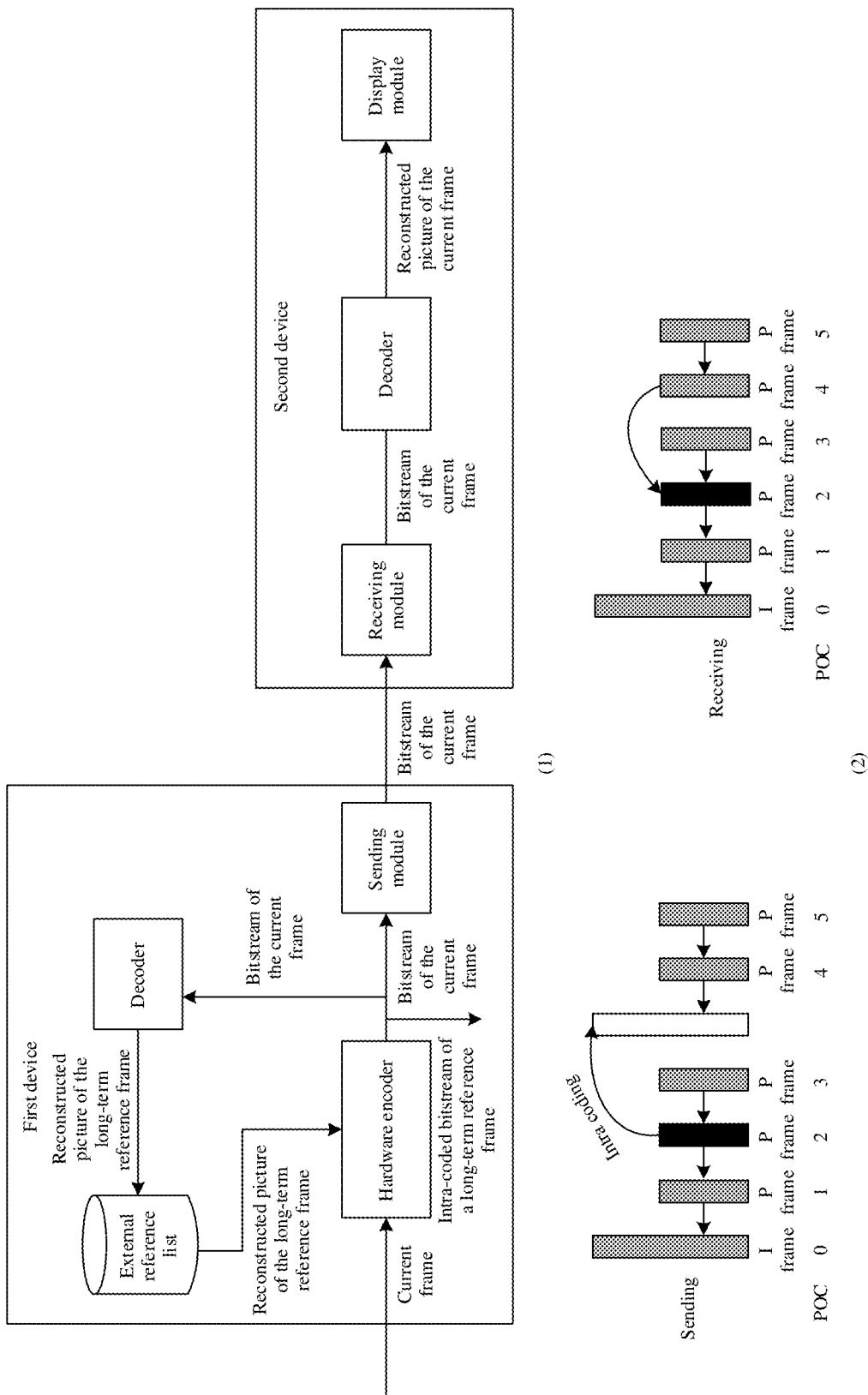
FIG. 5c is a diagram of an example of an encoding and decoding process.

FIG. 5c is a diagram of an example of an encoding and decoding process. In FIG. 5c(1), an encoder in a first device is a hardware encoder, and a decoder in a second device is a hardware codec or a software decoder. In FIG. 5c(2), gray and black frames in a left area are frames sent by the first device, and gray and black frames in a right area are frames received by the second device. The black frame indicates a long-term reference frame.

Compared with the encoding process in FIG. 5b, in an encoding process in FIG. 5c, encoding processes of the third P frame and the fourth P frame in FIG. 5c are different from those in FIG. 5b, and encoding processes of the other frames in FIG. 5c are similar to those in FIG. 5b. Details are not described herein again. In FIG. 5c, a reference frame parameter does not need to be added to a bitstream of the third P frame, but syntax elements in a bitstream of the fourth P frame need to be modified. Values of modified syntax elements in the bitstream of the fourth P frame may be, for example, pic_order_cnt_lsb=4, num_long_term_pics=1, poc_lsb_lt[0]=2, and used_by_curr_pic_lt_flag[0]=1.

Compared with the decoding process in FIG. 5b, in a decoding process in FIG. 5c, a decoding process of the fourth P frame is different from that in FIG. 5b, and decoding processes of the other frames are similar to those in FIG. 5b. Details are not described herein again. After receiving the bitstream of the fourth P frame, the second device may perform decoding with reference to a reconstructed picture of the second P frame, to obtain a reconstructed picture of the fourth P frame.

Figure 6:
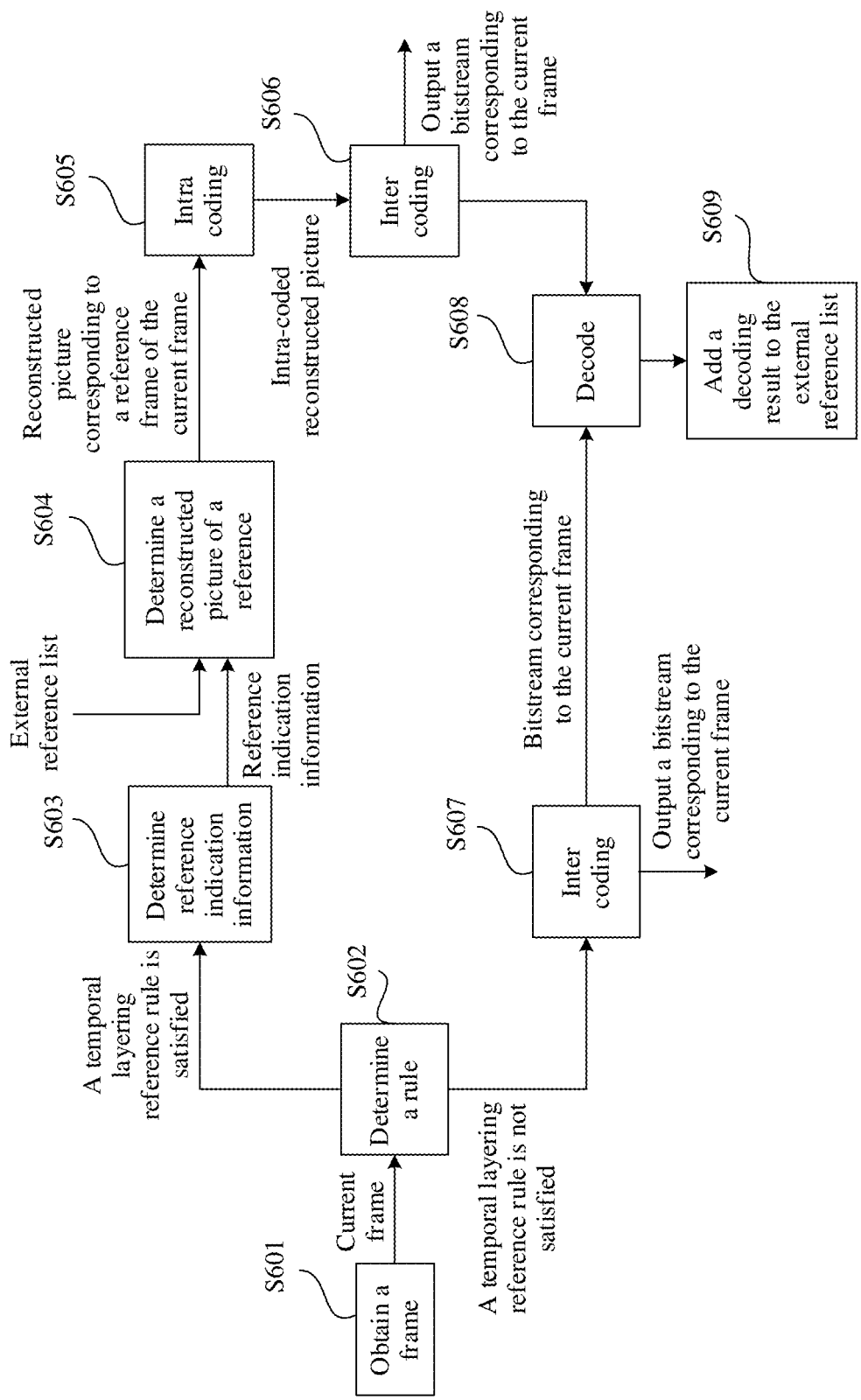
FIG. 6 is a diagram of an example of an encoding procedure.

FIG. 6 is a diagram of an example of an encoding procedure. In the embodiment in FIG. 6, a scenario in which a temporal layered reference frame is used for encoding is described. In the embodiment in FIG. 6, a preset reference rule is a temporal layering reference rule, and a preset reference frame setting rule is a temporal layered reference frame setting rule.

S601: Obtain a current frame.

S602: Determine whether the temporal layering reference rule is satisfied.

For example, the temporal layering reference rule may be set based on a temporal layered structure. For example, the temporal layering reference rule may also include a reference determining rule and a reference frame determining rule.

If the temporal layered structure is a temporal layered structure 1: The first frame (POC=0), the third frame (POC=2), the fifth frame (POC=4), and the seventh frame (POC=6) are at a layer T0 (that is, temporal layer (Temporal Layer, TL)=0), and the second frame (POC=1), the fourth frame (POC=3), the sixth frame (POC=5), and the eighth frame (POC=7) are at a layer T1 (that is, TL=1), that is, a quantity of temporal layers is 2, a corresponding reference manner is a reference manner 1: The third frame is encoded with reference to the first frame, the fifth frame is encoded with reference to the third frame, the seventh frame is encoded with reference to the fifth frame, the second frame is encoded with reference to the first frame, the fourth frame is encoded with reference to the third frame, the sixth frame is encoded with reference to the fifth frame, and the eighth frame is encoded with reference to the seventh frame. In this case, the reference determining rule in the temporal layering reference rule may be set as the temporal layered structure 1, where a POC value is an integer other than 8×(n−1) (a value of n is 0, 1, 2, . . . ); and the reference frame determining condition is the reference manner 1.

If the temporal layered structure is a temporal layered structure 2: The first frame (POC=0), the fifth frame (POC=4), and the ninth frame (POC=8) are at a layer T0, the third frame (POC=2), the seventh frame (POC=6), and the eleventh frame (POC=10) are at a layer T1, and the second frame (POC=1), the fourth frame (POC=3), the sixth frame (POC=5), the eighth frame (POC=7), the tenth frame (POC=9), and the twelfth frame (POC=11) are at a layer T2 (that is, TL=2), a corresponding reference manner is a reference manner 2: The second frame is encoded with reference to the first frame, the third frame is encoded with reference to the first frame, the fourth frame is encoded with reference to the third frame, the fifth frame is encoded with reference to the first frame, the sixth frame is encoded with reference to the fifth frame, the seventh frame is encoded with reference to the fifth frame, the eighth frame is encoded with reference to the seventh frame, the ninth frame is encoded with reference to the fifth frame, the tenth frame is encoded with reference to the ninth frame, the eleventh frame is encoded with reference to the ninth frame, and the twelfth frame is encoded with reference to the eleventh frame. In this case, the reference determining rule in the temporal layering reference rule may be set as the temporal layered structure 2, where a POC value is an integer other than 12×(n−1) (a value of n is 0, 1, 2, . . . ); and the reference frame determining condition is the reference manner 2.

In a possible manner, the temporal layered structure may be preset. In other words, the temporal layered structure is a fixed value.

In a possible manner, the temporal layered structure may be determined based on channel feedback information. For example, when it is determined, based on the channel feedback information, that channel quality is good, a quantity of temporal layers may be increased. When it is determined, based on the channel feedback information, that channel quality is poor, a quantity of temporal layers may be reduced. This is not limited in this application. In this case, the temporal layered structure is dynamic.

For example, when the temporal layering reference rule is satisfied, it is determined that the current frame needs to be encoded with reference to a temporal layered reference frame. In this case, S603 to S606 may be performed. When the temporal layering reference rule is not satisfied, it is determined that the current frame does not need to be encoded with reference to a temporal layered reference frame, and S607 may be performed.

S603: When it is determined that the temporal layering reference rule is satisfied, determine reference indication information according to the temporal layering reference rule.

For example, when it is determined that the temporal layering reference rule is satisfied, a frame identifier of a reconstructed picture corresponding to a temporal layered reference frame of the current frame may be determined according to the reference frame determining condition in the temporal layering reference rule, and then the frame identifier is determined as the reference indication information.

For example, it is assumed that the reference frame determining condition in the temporal layering reference rule is the reference manner 1. In this case, when a current frame is the third frame in a GOP to which the current frame belongs, it may be determined that the first frame in the GOP is a reference frame of the current frame. In this case, a frame identifier of a reconstructed picture of the first frame in an external reference list may be determined as reference indication information.

For example, it is assumed that the reference frame determining condition in the temporal layering reference rule is the reference manner 2. In this case, when a current frame is the fourth frame in a GOP to which the current frame belongs, it may be determined that the third frame in the GOP is a reference frame of the current frame. In this case, a frame identifier of a reconstructed picture of the third frame in an external reference list may be determined as reference indication information.

S604: Obtain, based on the reference indication information, the reconstructed picture corresponding to the temporal layered reference frame of the current frame from an external reference list of an encoder.

For example, the reference indication information may be matched with a frame identifier of a reconstructed picture corresponding to each reference frame in the external reference list, to obtain the reconstructed picture corresponding to the temporal layered reference frame of the current frame from the external reference list of the encoder.

S605: The encoder performs intra coding on the reconstructed picture corresponding to the temporal layered reference frame of the current frame.

S606: The encoder performs inter coding on the current frame based on an intra-coded reconstructed picture of the reconstructed picture corresponding to the temporal layered reference frame of the current frame, to obtain a bitstream corresponding to the current frame.

For example, for S605 and S606, refer to the foregoing descriptions of S302 to S304. Details are not described herein again.

S607: When it is determined that the temporal layering reference rule is not satisfied, an encoder performs inter coding on the current frame based on a reconstructed picture corresponding to a previous frame of the current frame, to obtain a bitstream corresponding to the current frame.

For example, for S607, refer to the foregoing descriptions of S407. Details are not described herein again.

S608: When it is determined that the current frame needs to be used as a temporal layered reference frame for subsequent encoding, generate a reconstructed picture of the current frame based on the bitstream corresponding to the current frame.

For example, a temporal layering setting rule may be set based on the temporal layered structure. Further, after encoding of the current frame is completed, whether the current frame needs to be used as the temporal layered reference frame for subsequent encoding may be determined according to the temporal layering setting rule. When it is determined that the temporal layering setting rule is satisfied, it is determined that the current frame needs to be used as the temporal layered reference frame for subsequent encoding, and the reconstructed picture of the current frame may be added to the external reference list of the encoder. When it is determined that the temporal layering setting rule is not satisfied, it is determined that the current frame does not need to be used as the temporal layered reference frame for subsequent encoding. In this case, the reconstructed picture of the current frame does not need to be added to the external reference list of the encoder, and the encoding procedure may be ended.

For example, the temporal layering setting rule may be the temporal layered structure 1, where the POC value is an integer other than 8×(n−1). It is assumed that the temporal layered structure is the foregoing temporal layered structure 1. If the current frame is the first frame, the third frame, the fifth frame, or the seventh frame, it may be determined that the temporal layering setting rule is satisfied, that is, the current frame needs to be used as the temporal layered reference frame for subsequent encoding.

S609: Add the reconstructed picture of the current frame to the external reference list.

For example, the reconstructed picture of the current frame may be added to the external reference list, and a corresponding frame identifier is set for the reconstructed picture of the current frame.

For example, after the bitstream corresponding to the current frame is obtained, a reference frame parameter may be added to the bitstream corresponding to the current frame. In the example in FIG. 6, in the reference frame parameter, a first identifier may identify whether the current frame is encoded with reference to the temporal layered reference frame, first indication information may indicate the reconstructed picture corresponding to the temporal layered reference frame of the current frame in the external reference list, a second identifier may identify whether the current frame is used as the temporal layered reference frame for subsequent encoding, and second indication information indicates the reconstructed picture of the current frame in the external reference list.

For example, after it is determined that the temporal layering reference rule is satisfied and the current frame is encoded based on the temporal layered reference frame in the external reference list, the first identifier may be assigned fifth preset information (for example, "C1"), and the first indication information is assigned the frame identifier corresponding to the reconstructed picture of the current frame in the external reference list. When it is not determined that the temporal layering reference rule is satisfied, the first identifier may be configured as sixth preset information (for example, "C0"), and "NULL" is assigned to the first indication information.

For example, after it is determined that the current frame needs to be used as the temporal layered reference frame for subsequent encoding and the reconstructed picture of the current frame is added to the external reference list, the second identifier may be configured as seventh preset information (for example, "D1"), and the second indication information is assigned the frame identifier corresponding to the reconstructed picture corresponding to the temporal layered reference frame of the current frame in the external reference list. When it is determined that the current frame does not need to be used as the temporal layered reference frame for subsequent encoding, the second identifier may be configured as eighth preset information (for example, "D0"), and "NULL" is assigned to the second indication information.

Figure 7A:
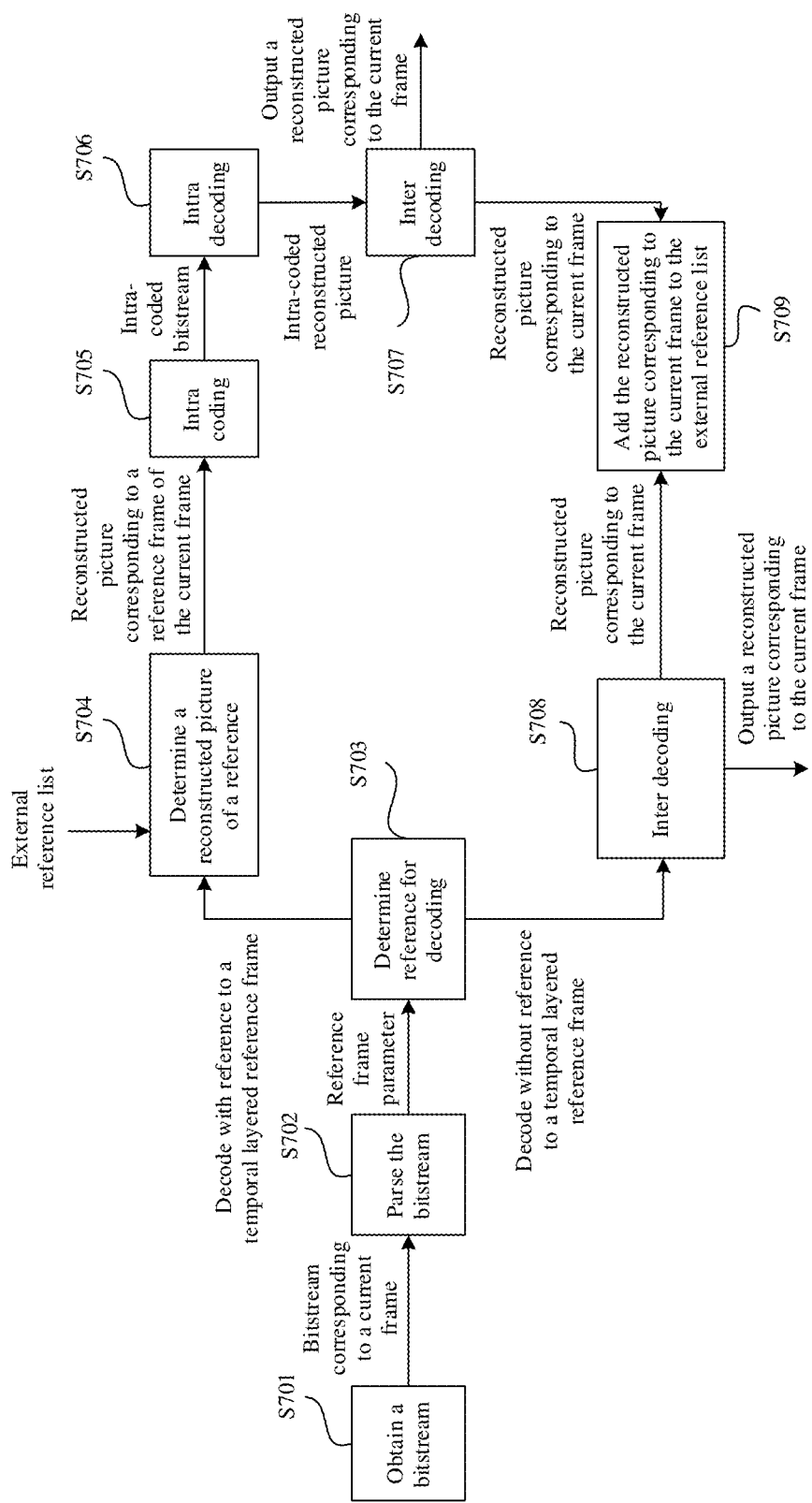
FIG. 7a is a diagram of an example of a decoding procedure.

FIG. 7a is a diagram of an example of a decoding procedure. In the embodiment in FIG. 7a, a scenario in which a temporal layered reference frame is used for decoding is described, and corresponds to the encoding process in the embodiment in FIG. 6.

S701: Receive a bitstream corresponding to a current frame.

S702: Parse the bitstream corresponding to the current frame, to obtain a reference frame parameter.

S703: Determine, based on the reference frame parameter, whether the current frame needs to be decoded with reference to a temporal layered reference frame.

For example, after the reference frame parameter is parsed out from the bitstream corresponding to the current frame, it may be determined whether a first identifier is present in the reference frame parameter. When the first identifier is present in the reference frame parameter, it is determined whether a value of the first identifier is fifth preset information. If the value of the first identifier is the fifth preset information, it is determined that the current frame needs to be decoded with reference to the temporal layered reference frame. In this case, S704 to S707 may be performed. If the value of the first identifier is sixth preset information, or the reference frame parameter does not include the first identifier, it is determined that the current frame does not need to be decoded with reference to the temporal layered reference frame. In this case, S708 may be performed.

S704: When it is determined that the current frame needs to be decoded with reference to the temporal layered reference frame, determine, based on the reference frame parameter, a reconstructed picture corresponding to a temporal layered reference frame of the current frame from an external reference list of a decoder, where a temporal layered reference frame in the external reference list is a decoded frame.

For example, when it is determined that the current frame needs to be decoded with reference to the temporal layered reference frame, a reconstructed picture that matches first indication information in the reference frame parameter is determined from the external reference list of the decoder as the reconstructed picture corresponding to the temporal layered reference frame of the current frame.

S705: Perform intra coding on the reconstructed picture, to obtain a corresponding intra-coded bitstream.

S706: The decoder performs intra decoding on the intra-coded bitstream.

S707: Based on an intra-coded reconstructed picture obtained by decoding the intra-coded bitstream, the decoder performs inter decoding on the bitstream corresponding to the current frame, to obtain a reconstructed picture of the current frame.

For example, for S705 to S707, refer to the foregoing descriptions of S303 to S305. Details are not described herein again.

S708: When it is determined that the current frame does not need to be decoded with reference to the temporal layered reference frame, a decoder performs, based on a reconstructed picture corresponding to a previous frame of the current frame, inter decoding on the bitstream corresponding to the current frame, to obtain a reconstructed picture of the current frame.

For example, when it is determined that the current frame does not need to be decoded with reference to the temporal layered reference frame, the bitstream corresponding to the current frame may be directly input to the decoder, and then the decoder decodes, based on the reconstructed picture corresponding to the previous frame of the current frame, the bitstream corresponding to the current frame, to obtain the reconstructed picture of the current frame.

For example, whether the current frame needs to be used as a temporal layered reference frame for subsequent decoding may be determined based on the reference frame parameter. For example, it may be determined whether the reference frame parameter includes a second identifier. When the reference frame parameter includes the second identifier, it may be determined whether a value of the second identifier is seventh preset information. When the value of the second identifier is the seventh preset information, it may be determined that the current frame needs to be used as the temporal layered reference frame for subsequent decoding. In this case, S709 may be performed. When the value of the second identifier is eighth preset information, or the reference frame parameter does not include the second identifier, it may be determined that the current frame does not need to be used as the temporal layered reference frame for subsequent decoding, and the decoding procedure may be ended.

S709: When it is determined that the current frame needs to be used as the temporal layered reference frame for subsequent decoding, add the reconstructed picture of the current frame to the external reference list.

For example, the reconstructed picture of the current frame may be added to the external reference list, and a corresponding frame identifier is set for the reconstructed picture of the current frame.

Certainly, intra coding may also be performed on the reconstructed picture of the current frame, to obtain an intra-coded bitstream corresponding to the reconstructed picture of the current frame; and then the intra-coded bitstream corresponding to the reconstructed picture of the current frame is added to the external reference list. For details, refer to the foregoing descriptions. Details are not described herein again.

Figure 7B:
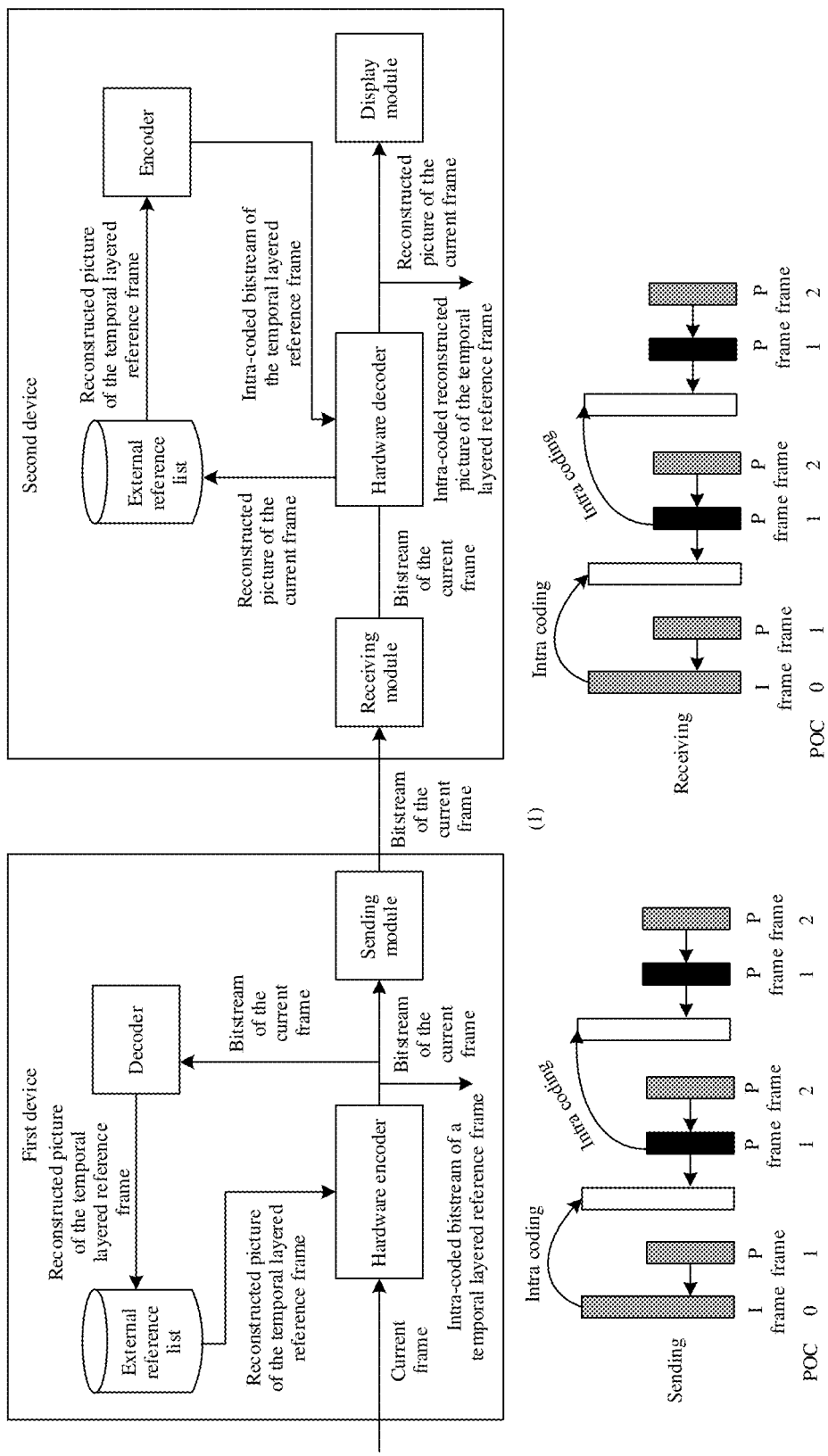
FIG. 7b is a diagram of an example of an encoding and decoding process.

FIG. 7b is a diagram of an example of an encoding and decoding process. In FIG. 7b(1), an encoder in a first device is a hardware encoder, and a decoder in a second device is a hardware decoder. In FIG. 7b(2), gray and black frames in a left area are frames sent by the first device, and gray and black frames in a right area are frames received by the second device. The black frame is a temporal layered reference frame.

It is assumed that a temporal layered structure is as follows: The first frame (POC=0), the third frame (POC=2), and the fifth frame (POC=4) are at a layer T0, and the second frame (POC=1), the fourth frame (POC=3), and the sixth frame (POC=5) are at a layer T1. A corresponding reference manner is as follows: The third frame is encoded with reference to the first frame, the fifth frame is encoded with reference to the third frame, the second frame is encoded with reference to the first frame, the fourth frame is encoded with reference to the third frame, and the sixth frame is encoded with reference to the fifth frame.

With reference to FIG. 7b(1) and FIG. 7b(2), in a process of encoding a video sequence, at a moment t0, when a current frame is an I frame, the hardware encoder may perform intra coding on the I frame, to obtain a bitstream of the I frame. Because the I frame needs to be used as a temporal reference frame for subsequent encoding, the bitstream of the I frame may be input to the decoder to obtain a reconstructed picture of the I frame output by the decoder, and then the reconstructed picture of the I frame is stored into an external reference list. Then, a second identifier may be added to the bitstream of the I frame, the second identifier is assigned third preset information, second indication information (for example, 0) is added to the bitstream of the I frame, and then the bitstream of the I frame to which a reference frame parameter is added is sent to the second device. At a moment t1, a current frame is the first P frame, and the hardware encoder may encode the first P frame with reference to the reconstructed picture of the I frame to obtain a bitstream of the first P frame, and then send the bitstream of the first P frame to the second device. At a moment t2, a current frame is the second P frame, and the hardware encoder may obtain the reconstructed picture of the I frame from the external reference list, and then perform intra coding on the reconstructed picture of the I frame, to obtain an intra-coded bitstream (not sent) of the reconstructed picture of the I frame and an intra-coded reconstructed picture of the reconstructed picture of the I frame. Then, the second P frame is input to the hardware encoder, and the hardware encoder encodes the second P frame with reference to the intra-coded reconstructed picture of the reconstructed picture of the I frame, to obtain a bitstream of the second P frame. Then, a first identifier may be added to the bitstream of the second P frame, the first identifier is assigned first preset information, and first indication information (for example, 0) is added to the bitstream of the second P frame; and the second identifier is added to the bitstream of the second P frame, the second identifier is assigned the third preset information, and the second indication information (for example, 2) is added to the bitstream of the second P frame. Then, the bitstream of the second P frame to which the reference frame parameter is added is sent to the second device. At a moment t3, a current frame is the third P frame, and the hardware encoder may encode the third P frame with reference to a reconstructed picture of the second P frame to obtain a bitstream of the third P frame, and then send the bitstream of the third P frame to the second device. At a moment t4, a current frame is the fourth P frame, and the hardware encoder may obtain a reconstructed picture of the third P frame from the external reference list, and then the hardware encoder may perform intra coding on the reconstructed picture of the third P frame, to obtain an intra-coded bitstream (not sent) of the reconstructed picture of the third P frame and an intra-coded reconstructed picture of the reconstructed picture of the third P frame. Then, the fourth P frame is input to the hardware encoder, and the hardware encoder encodes the fourth P frame with reference to the intra-coded reconstructed picture of the reconstructed picture of the third P frame, to obtain a bitstream of the fourth P frame. Then, the first identifier may be added to the bitstream of the fourth P frame, the first identifier is assigned the first preset information, and the first indication information (for example, 2) is added to the bitstream of the fourth P frame; and the second identifier is added to the bitstream of the fourth P frame, the second identifier is assigned the third preset information, and the second indication information (for example, 4) is added to the bitstream of the fourth P frame. Then, the bitstream of the fourth P frame to which the reference frame parameter is added is sent to the second device. At a moment t5, a current frame is the fifth P frame, and the hardware encoder may encode the fifth P frame with reference to a reconstructed picture of the fourth P frame to obtain a bitstream of the fifth P frame, and then send the bitstream of the fifth P frame to the second device.

With reference to FIG. 7b(1) and FIG. 7b(2), in a process of decoding the video sequence, at the moment to, when a current frame is the I frame, the hardware decoder may perform intra decoding on the bitstream of the I frame to obtain the reconstructed picture of the I frame. Then, the reconstructed picture of the I frame is sent to a display module for display. In addition, the reconstructed picture of the I frame may be stored into an external reference list based on a second identifier and second indication information. At the moment t1, a current frame is the first P frame, and the hardware decoder may decode the bitstream of the first P frame with reference to the reconstructed picture of the I frame to obtain a reconstructed picture of the first P frame, and then send the reconstructed picture of the first P frame to the display module. At the moment t2, a current frame is the second P frame, and the reconstructed picture of the I frame may be obtained from the external reference list based on the first identifier and the first indication information. Then, the reconstructed picture of the I frame is input to the encoder, and the encoder may perform intra coding on the reconstructed picture of the I frame, to obtain the intra-coded bitstream of the reconstructed picture of the I frame. Then, the encoder sends the intra-coded bitstream of the reconstructed picture of the I frame to the hardware decoder, and the hardware decoder may obtain, through decoding, the intra-decoded reconstructed picture (not sent) of the reconstructed picture of the I frame. Then, the bitstream of the second P frame is input to the hardware decoder, and the hardware decoder decodes the bitstream of the second P frame based on the intra-decoded reconstructed picture of the reconstructed picture of the I frame to obtain the reconstructed picture of the second P frame. Then, the reconstructed picture of the second P frame is sent to the display module. In addition, the reconstructed picture of the second P frame may be stored into the external reference list based on the second identifier and the second indication information. At the moment t3, a current frame is the third P frame, and the hardware decoder may decode the bitstream of the third P frame with reference to the reconstructed picture of the second P frame to obtain the reconstructed picture of the third P frame, and then send the reconstructed picture of the third P frame to the display module. At the moment t4, a current frame is the fourth P frame, and the reconstructed picture of the second P frame may be obtained from the external reference list based on the first identifier and the first indication information. Then, the reconstructed picture of the second P frame is input to the encoder, and the encoder may perform intra coding on the reconstructed picture of the second P frame, to obtain an intra-coded bitstream of the reconstructed picture of the second P frame. Then, the encoder sends the intra-coded bitstream of the reconstructed picture of the second P frame to the hardware decoder, and the hardware decoder may obtain, through decoding, an intra-decoded reconstructed picture (not sent) of the reconstructed picture of the second P frame. Then, the bitstream of the fourth P frame is input to the hardware decoder, and the hardware decoder decodes the bitstream of the fourth P frame based on an intra-decoded reconstructed picture of the reconstructed picture of the third P frame to obtain the reconstructed picture of the fourth P frame. Then, the reconstructed picture of the fourth P frame is sent to the display module. In addition, the reconstructed picture of the fourth P frame may be stored into the external reference list based on the second identifier and the second indication information. At the moment t5, a current frame is the fifth P frame, and the hardware decoder may decode the bitstream of the fifth P frame with reference to the reconstructed picture of the fourth P frame to obtain a reconstructed picture of the fifth P frame, and then send the reconstructed picture of the fifth P frame to the display module.

In a possible manner, after the first device performs S601 to S608, a standard syntax element that is used to identify a reference frame of the current frame and that is in the bitstream corresponding to the current frame may be modified, where the standard syntax element is a syntax element specified in a standard coding protocol.

For example, after the first device performs S601 to S608, the standard syntax element that is used to identify the reference frame of the current frame and that needs to be modified includes at least one of the following: a syntax element used to identify a POC value of the current frame, a syntax element used to identify whether a negative reference frame is used, a syntax element used to identify a quantity of negative reference frames, a syntax element used to identify a distance between the current frame and a negative reference frame, and a syntax element used to identify whether a negative reference frame is used as a reference for the current frame. Certainly, another standard syntax element that is used to identify the reference frame of the current frame may be further included. This is not limited in this application.

The coding protocol H265 is used as an example, the standard syntax element that is in the bitstream corresponding to the current frame and that is related to the reference frame of the current frame may be shown in Table 2.

TABLE 2

| Syntax element | Description |
| --- | --- |
| pic_order_cnt_lsb | Identify a POC value of a current frame |
| short_term_ref_pic_set_sps_flag | Identify whether a negative reference frame is used |
| num_negative_pics | Identify a quantity of negative reference frames |
| delta_poc_s0_minus1[i] | Identify a distance between the current frame and an $i^{th}$ negative reference frame |
| used_by_curr_pic_s0_flag[i] | Identify whether the $i^{th}$ negative reference frame is used as a reference for the current frame |

It should be understood that the syntax elements shown in Table 2 are merely some examples of the standard syntax element that is used to identify the reference frame of the current frame and that is in the bitstream corresponding to the current frame. In this application, the standard syntax element that is used to identify the reference frame of the current frame and that is in the bitstream corresponding to the current frame may have more or fewer syntax elements than those in Table 2. Details are not described herein again.

It is assumed that the temporal layered structure is a temporal layered structure 1: The first frame (POC=0), the third frame (POC=2), the fifth frame (POC=4), and the seventh frame (POC=6) are at a layer T0 (that is, temporal layer (Temporal Layer, TL)=0), and the second frame (POC=1), the fourth frame (POC=3), the sixth frame (POC=5), and the eighth frame (POC=7) are at a layer T1 (that is, TL=1), that is, a quantity of temporal layers is 2. A corresponding reference manner is a reference manner 1: The third frame is encoded with reference to the first frame, the fifth frame is encoded with reference to the third frame, the seventh frame is encoded with reference to the fifth frame, the second frame is encoded with reference to the first frame, the fourth frame is encoded with reference to the third frame, the sixth frame is encoded with reference to the fifth frame, and the eighth frame is encoded with reference to the seventh frame. If the current frame is the sixth frame, because before encoding the current frame, the encoder performs intra coding on a reconstructed picture corresponding to a reference frame (namely, the fifth frame) of the current frame, and a POC in an obtained intra-coded bitstream is 0. Therefore, a POC in a bitstream obtained by encoding the current frame by the encoder is 1. To enable the decoder to perform decoding normally, a picture order count POC in the bitstream corresponding to the current frame may be modified to 5, that is, a value of pic_order_cnt_lsb is modified from 0 to 5, so that the POC in the bitstream corresponding to the current frame is continuous with a POC in a bitstream corresponding to the frame previous to the current frame. In addition, a value of short_term_ref_pic_set_sps_flag in the bitstream corresponding to the current frame is configured to "1", indicating that the current frame is encoded with reference to a negative reference frame.

It is assumed that the reference frame of the current frame is the fifth frame. If the external reference list includes three temporal layered reference frames, and the three temporal layered reference frames are the first frame (POC=0), the third frame (POC=2), and the fifth frame (POC=4), a value of num_negative_pics may be modified from 0 to 3, a value of delta_poc_s0_minus1 [0] may be modified from "NULL" to "0", a value of delta_poc_s0_minus1 [1] may be modified from "NULL" to "2", and a value of delta_poc_s0_minus1 [2] may be modified from "NULL" to "4". In addition, a value of used_by_curr_pic_s0_flag[0] may be modified from "NULL" to "0", a value of used_by_curr_pic_s0_flag [1] may be modified from "NULL" to "0", and a value of used_by_curr_pic_s0_flag[2] may be modified from "NULL" to "1". used_by_curr_pic_s0_flag[0]=0 indicates that the first frame is not used as a reference for the current frame, used_by_curr_pic_s0_flag[1]=0 indicates that the third frame is not used as a reference for the current frame, and used_by_curr_pic_s0_flag[2]=1 indicates that the fifth frame is used as a reference for the current frame.

Figure 7C:
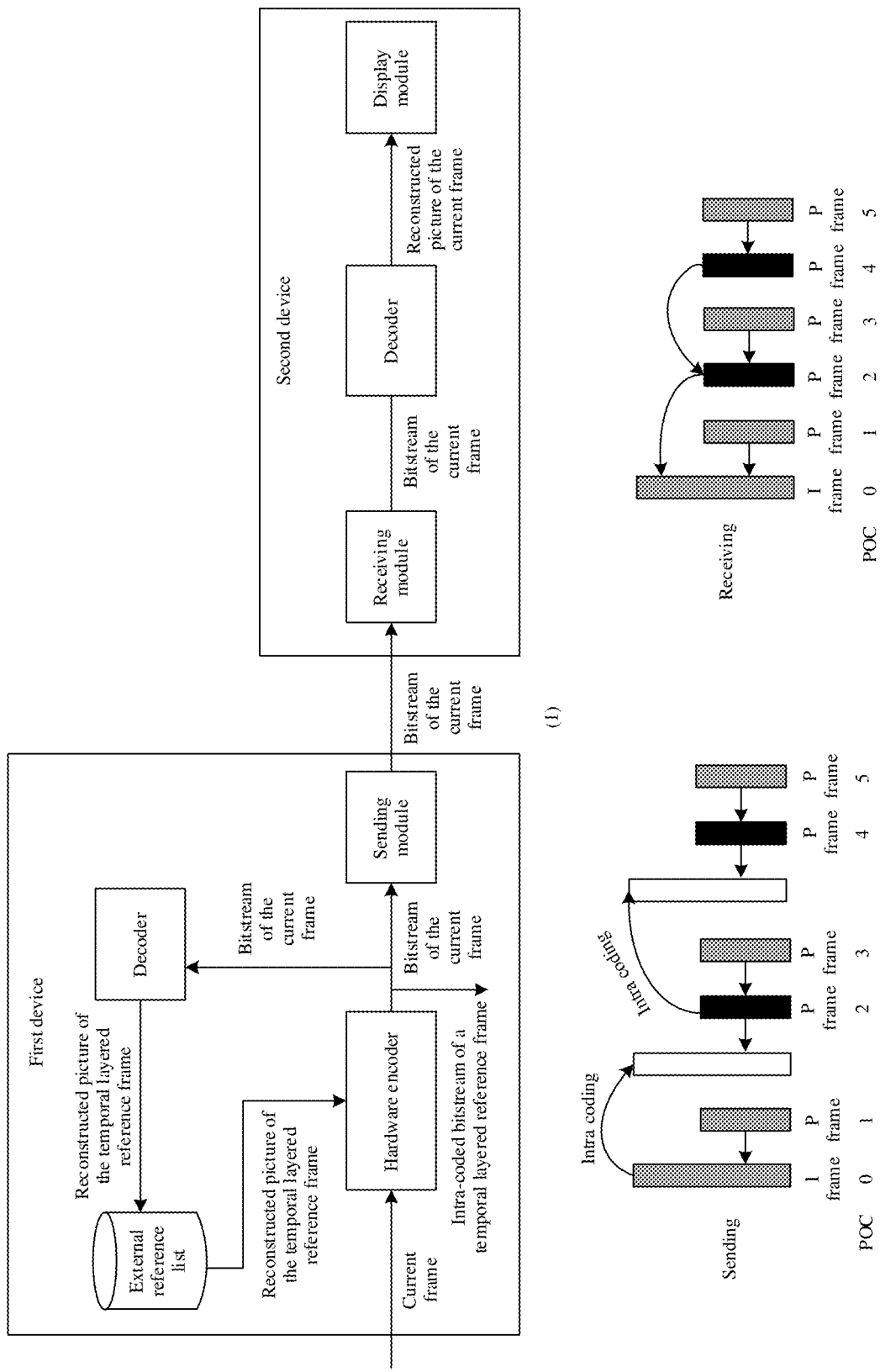
FIG. 7c is a diagram of an example of an encoding and decoding process.

FIG. 7c is a diagram of an example of an encoding and decoding process. In FIG. 7c(1), an encoder in a first device is a hardware encoder, and a decoder in a second device is a hardware codec or a software decoder. In FIG. 7c(2), gray and black frames in a left area are frames sent by the first device, and gray and black frames in a right area are frames received by the second device. The black frame indicates a temporal layered reference frame.

Compared with the encoding process in FIG. 7b, in an encoding process in FIG. 7c, encoding processes of an I frame, the second P frame, and the fourth P frame are different from those in FIG. 7b, and encoding processes of the other frames are similar to those in FIG. 7b. Details are not described herein again. In FIG. 7c, a reference frame parameter does not need to be added to a bitstream of the I frame, a bitstream of the second P frame, and a bitstream of the fourth P frame, but syntax elements in the bitstream of the second P frame and the bitstream of the fourth P frame need to be modified. Values of modified syntax elements in the bitstream of the second P frame may be, for example, pic_order_cnt_lsb=2, num_long_term_pics=1, poc_lsb_lt[0]-0, and used_by_curr_pic_lt_flag[0]=1. Values of modified syntax elements in the bitstream of the fourth P frame may be, for example, pic_order_cnt_lsb=4, num_long_term_pics=2, poc_lsb_lt[0]=0, poc_lsb_lt[1]=2, used_by_curr_pic_lt_flag[0]=0, and used_by_curr_pic_lt_flag[1]=1.

Compared with the decoding process in FIG. 5c, in a decoding process in FIG. 7c, decoding processes of the second P frame and the fourth P frame are different from those in FIG. 5c, and decoding processes of the other frames are similar to those in FIG. 5c. Details are not described herein again. After receiving the bitstream of the second P frame, the second device may perform decoding with reference to a reconstructed picture of the I frame, to obtain a reconstructed picture of the second P frame. After receiving the bitstream of the fourth P frame, the second device may perform decoding with reference to the reconstructed picture of the second P frame, to obtain a reconstructed picture of the fourth P frame.

Figure 8:
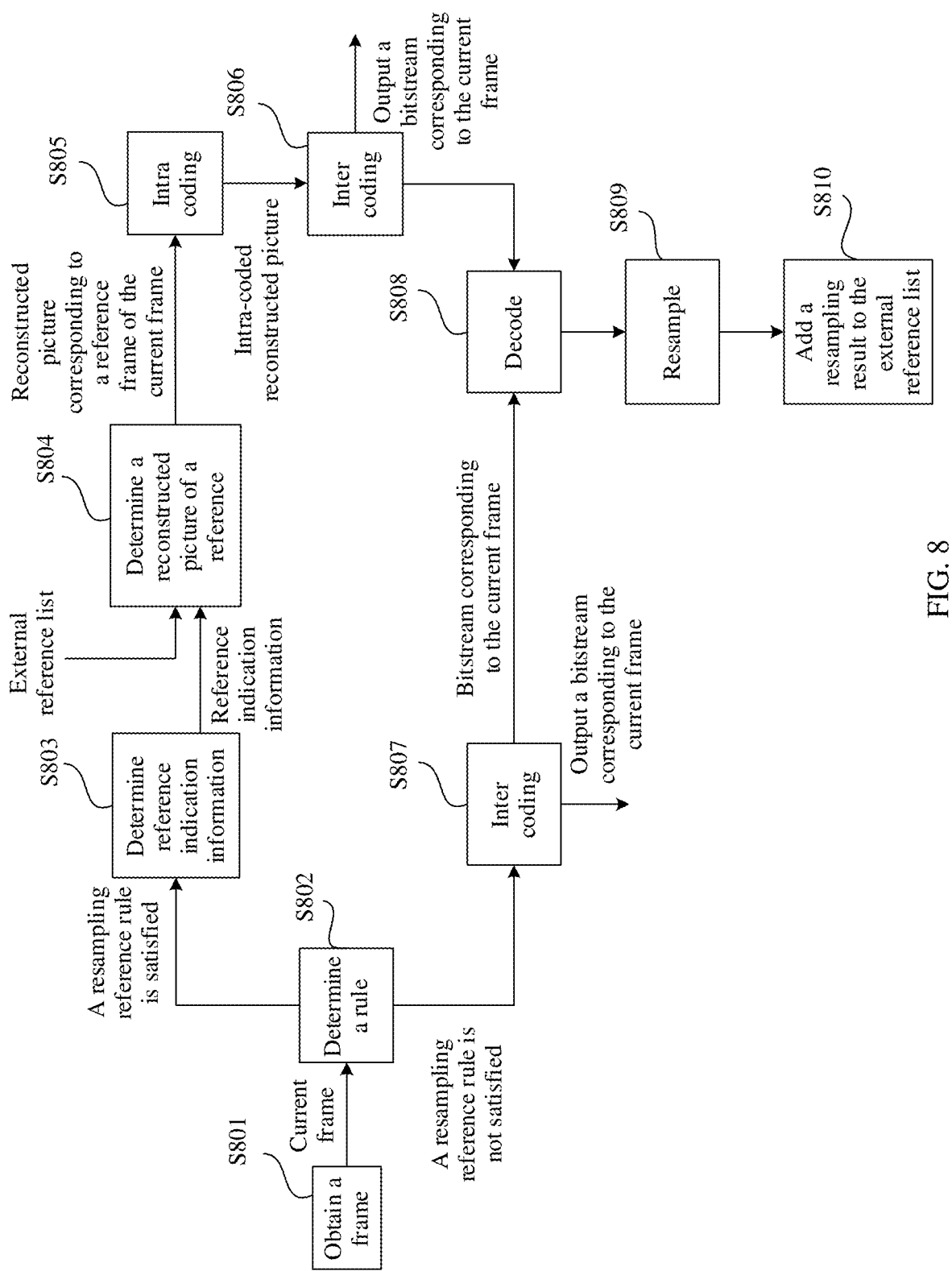
FIG. 8 is a diagram of an example of an encoding procedure.

FIG. 8 is a diagram of an example of an encoding procedure. In the embodiment in FIG. 8, a scenario in which reference frame resampling is used for encoding is described. In the embodiment in FIG. 8, a preset reference rule is a resampling reference rule, and a preset reference frame setting rule is a resampling setting rule.

S801: Obtain a current frame.

S802: Determine whether the resampling reference rule is satisfied.

For example, the resampling reference rule may be set based on a reference period of resampling, a resampling status of a previous frame, and the like. This is not limited in this application. For example, the resampling reference rule may also include a reference determining rule and a reference frame determining rule.

In a possible manner, the resampling reference rule is set based on the reference period of resampling. For example, the reference determining rule in the resampling reference rule may be set as follows: The reference period of resampling is reached (which may mean that a distance difference from a frame that is closest to the current frame and that is encoded with reference to a resampled reference frame to the current frame reaches the reference period of resampling). The reference frame determining rule in the resampling reference rule may be set as follows: a resampled reference frame closest to the current frame in an external reference list. For example, a reference period of a resampled reference frame may be set as required, for example, 10 frames. This is not limited in this application.

In a possible manner, the resampling reference rule is set based on the resampling status of the previous frame. For example, the reference determining rule in the resampling reference rule may be set as follows: Resampling is performed on the previous frame of the current frame. The reference frame determining rule in the resampling reference rule may be set as follows: a resampled reference frame closest to the current frame in an external reference list.

For example, when the resampling reference rule is satisfied, it is determined that the current frame needs to be encoded with reference to a resampled reference frame. In this case, S803 to S806 may be performed. When the resampling reference rule is not satisfied, it is determined that the current frame does not need to be encoded with reference to a resampled reference frame, and S807 may be performed.

S803: When it is determined that the resampling reference rule is satisfied, determine reference indication information according to the resampling reference rule.

For example, when it is determined that the resampling reference rule is satisfied, a frame identifier of a reconstructed picture corresponding to a resampled reference frame of the current frame may be determined according to the reference frame determining rule in the resampling reference rule, and then the frame identifier is determined as the reference indication information.

For example, when the reference frame determining rule in the resampling reference rule is the resampled reference frame closest to the current frame in the external reference list, a frame identifier of a reconstructed picture corresponding to the resampled reference frame closest to the current frame in the external reference list may be used as the reference indication information.

S804: Obtain, based on the reference indication information, the reconstructed picture corresponding to the resampled reference frame of the current frame from an external reference list of an encoder.

For example, the reference indication information may be matched with a frame identifier of a reconstructed picture corresponding to each reference frame in the external reference list, to obtain the reconstructed picture corresponding to the resampled reference frame of the current frame from the external reference list of the encoder.

S805: The encoder performs intra coding on the reconstructed picture corresponding to the resampled reference frame of the current frame.

S806: The encoder performs inter coding on the current frame based on an intra-coded reconstructed picture of the reconstructed picture corresponding to the resampled reference frame of the current frame, to obtain a bitstream corresponding to the current frame.

For example, for S805 and S806, refer to the foregoing descriptions of S302 to S304. Details are not described herein again.

S807: When it is determined that the resampling reference rule is not satisfied, an encoder performs inter coding on the current frame based on a reconstructed picture corresponding to a previous frame of the current frame, to obtain a bitstream corresponding to the current frame. For example, for S807, refer to the foregoing descriptions of S407. Details are not described herein again.

S808: When it is determined that the current frame needs to be used as a resampled reference frame for subsequent encoding, generate a reconstructed picture of the current frame based on the bitstream corresponding to the current frame.

For example, the resampling setting rule may be set based on a setting period of a resampled reference frame (which may also be referred to as a resampling period), channel quality, and the like. This is not limited in this application. Further, after encoding of the current frame is completed, whether the current frame needs to be used as the resampled reference frame for subsequent encoding (that is, whether resampling needs to be performed on the current frame) may be determined by determining whether the resampling setting rule is satisfied. When it is determined that the resampling setting rule is satisfied, it is determined that the current frame needs to be used as the resampled reference frame for subsequent encoding (or resampling needs to be performed on the current frame), and S809 may be performed. When it is determined that the resampling setting rule is not satisfied, the current frame does not need to be used as the resampled reference frame for subsequent encoding (or resampling does not need to be performed on the current frame). In this case, the encoding procedure may be ended.

In a possible manner, the resampled reference frame setting rule is set based on the setting period of the resampled reference frame. The resampling setting rule may be as follows: The setting period of the resampled reference frame is reached (which may mean that a distance difference from a resampled reference frame closest to the current frame to the current frame reaches a setting period of resampling). In a possible manner, the setting period of the resampled reference frame may be a preset fixed value, for example, 9. This is not limited in this application. It is assumed that a setting period of a long-term reference frame is 9. If the current frame is the ninth frame, it may be determined that the setting period of the resampled reference frame is reached. In this case, it may be determined that the resampling setting rule is satisfied, that is, it is determined that the current frame needs to be used as the resampled reference frame for subsequent encoding (or resampling needs to be performed on the current frame).

In a possible manner, the resampled reference frame setting rule may be set based on the channel quality. For example, a long-term reference frame setting rule may include: A channel quality change degree is greater than a first threshold, or a channel quality change degree is less than a second threshold, where the first threshold is a positive number, and the second threshold is a negative number, and the first threshold and the second threshold may be set as required. This is not limited in this application. For example, if it is detected that the channel quality change degree is greater than the first threshold, it indicates that the channel quality becomes better. In this case, a channel may carry a higher bit rate. Therefore, a resolution of the current frame may be increased, and it may be further determined that the resampled reference frame setting rule is satisfied, that is, it is determined that resampling needs to be performed on the current frame (or resampling needs to be performed on the current frame). If it is detected that the channel quality change degree is less than the second threshold, it indicates that the channel quality deteriorates. In this case, a channel may carry a lower bit rate. Therefore, a resolution of the current frame may be reduced, and it may be further determined that the resampling setting rule is satisfied. Otherwise, it is determined that the resampling setting rule is satisfied, that is, the current frame does not need to be used as the resampled reference frame for subsequent encoding (or resampling does not need to be performed on the current frame).

S809: Resample the reconstructed picture of the current frame.

S810: Add a resampled reconstructed picture to the external reference list.

For example, when the resampling setting rule is set, a corresponding target resolution for resampling may be further set. For example, the resampling setting rule is as follows: The setting period of the resampled reference frame is reached, the corresponding target resolution for resampling may be set to 1720*920. For another example, the resampling setting rule is as follows: The channel quality change degree is greater than the first threshold, and the corresponding target resolution for resampling may be set to 1720*1080. For another example, the resampling setting rule is as follows: The channel quality change degree is greater than the first threshold, and the corresponding target resolution for resampling may be set to 960*480.

Further, the reconstructed picture of the current frame may be resampled based on a target resolution for resampling. Then, the resampled reconstructed picture is added to the external reference list.

For example, after the bitstream corresponding to the current frame is obtained, a reference frame parameter may be added to the bitstream corresponding to the current frame. In the example in FIG. 8, in the reference frame parameter, a first identifier may identify whether the current frame is encoded with reference to the resampled reference frame, first indication information may indicate the reconstructed picture corresponding to the resampled reference frame of the current frame in the external reference list, a third identifier identifies whether resampling is performed on the current frame, third indication information indicates the resampled reconstructed picture of the current frame in the external reference list, and a resampling resolution includes a resolution corresponding to the reconstructed picture of the current frame and a resolution corresponding to the resampled reconstructed picture.

For example, after it is determined that the resampling reference rule is satisfied and the current frame is encoded based on/with reference to the resampled reference frame, the first identifier may be assigned ninth preset information (for example, "E1"), and the first indication information is assigned the frame identifier corresponding to the reconstructed picture of the current frame in the external reference list. When it is not determined that the resampling reference rule is satisfied, the first identifier may be configured as tenth preset information (for example, "E0"), and "NULL" is assigned to the first indication information.

For example, when it is determined that resampling needs to be performed on the current frame, the third identifier may be configured as eleventh preset information (for example, "F1"), and the third indication information is assigned the frame identifier corresponding to the reconstructed picture corresponding to the resampled reference frame of the current frame in the external reference list. When it is determined that resampling does not need to be performed on the current frame, a second identifier may be configured as twelfth preset information (for example, "F0"), and "NULL" is assigned to the second indication information.

Figure 9A:
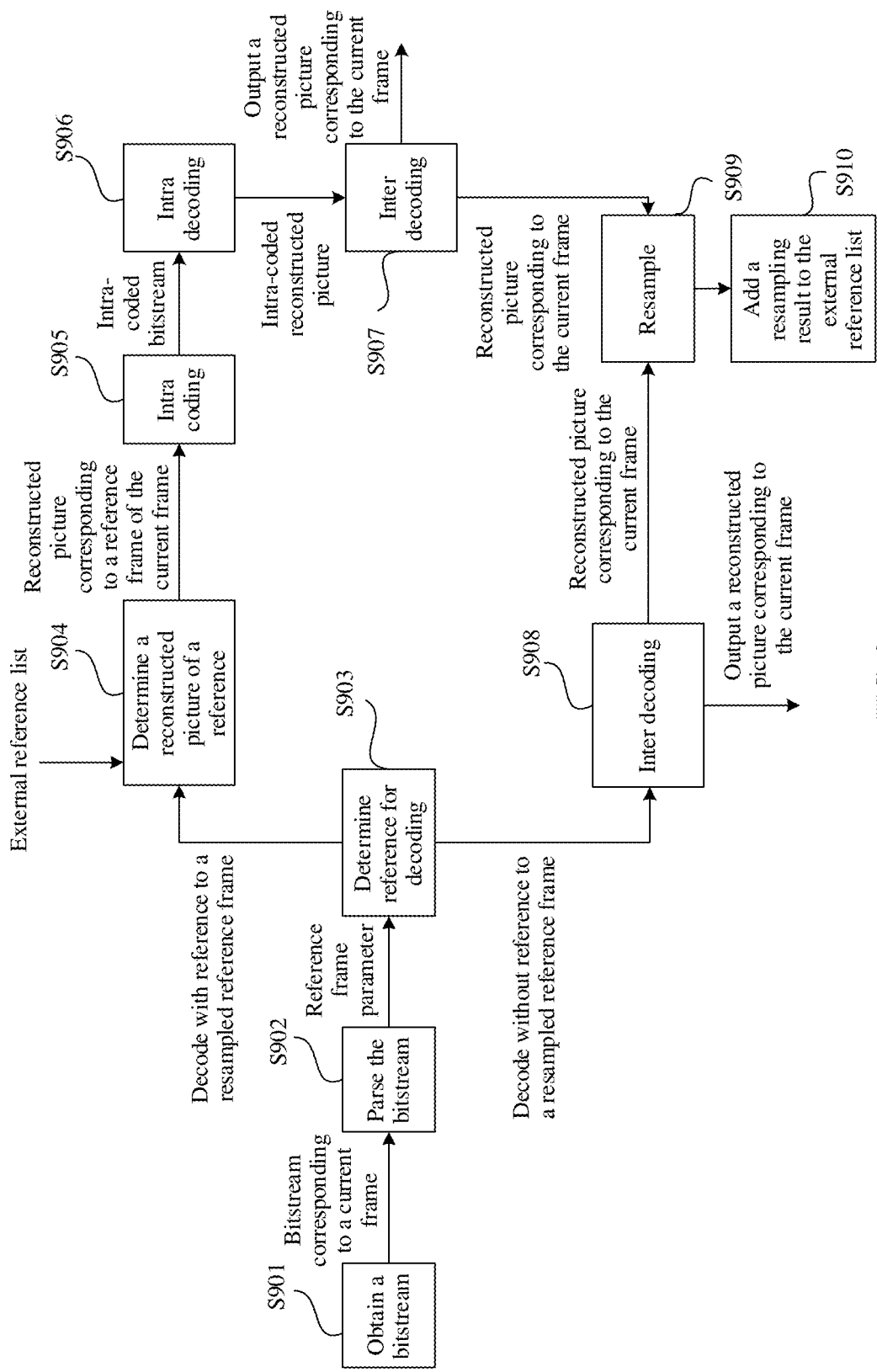
FIG. 9a is a diagram of an example of a decoding procedure.

FIG. 9a is a diagram of an example of a decoding procedure. In the embodiment in FIG. 9a, a scenario in which reference frame resampling is used for decoding is described, and corresponds to the encoding process in the embodiment in FIG. 8.

S901: Receive a bitstream corresponding to a current frame.

S902: Parse the bitstream corresponding to the current frame, to obtain a reference frame parameter.

S903: Determine, based on the reference frame parameter, whether the current frame needs to be decoded with reference to a resampled reference frame.

For example, after the reference frame parameter is parsed out from the bitstream corresponding to the current frame, it may be determined whether a first identifier is present in the reference frame parameter. When the first identifier is present in the reference frame parameter, it is determined whether a value of the first identifier is ninth preset information. If the value of the first identifier is the ninth preset information, it is determined that the current frame needs to be decoded with reference to the resampled reference frame. In this case, S904 to S907 may be performed. If the value of the first identifier is tenth preset information, or the reference frame parameter does not include the first identifier, it is determined that the current frame does not need to be decoded with reference to the resampled reference frame. In this case, S908 may be performed.

S904: When it is determined that the current frame needs to be decoded with reference to the resampled reference frame, determine, based on the reference frame parameter, a reconstructed picture corresponding to a resampled reference frame of the current frame from an external reference list of a decoder, where a resampled reference frame in the external reference list is a decoded frame.

For example, when it is determined that the current frame needs to be decoded with reference to the resampled reference frame, a reconstructed picture that matches second indication information in the reference frame parameter is determined from the external reference list of the decoder as the reconstructed picture corresponding to the resampled reference frame of the current frame.

S905: Perform intra coding on the reconstructed picture, to obtain a corresponding intra-coded bitstream.

S906: The decoder performs intra decoding on the intra-coded bitstream.

S907: Based on an intra-coded reconstructed picture obtained by decoding the intra-coded bitstream, the decoder performs inter decoding on the bitstream corresponding to the current frame, to obtain a reconstructed picture of the current frame.

For example, for S905 to S907, refer to the foregoing descriptions of S303 to S305. Details are not described herein again.

S908: When it is determined that the current frame does not need to be decoded with reference to the resampled reference frame, a decoder performs, based on a reconstructed picture corresponding to a previous frame of the current frame, inter decoding on the bitstream corresponding to the current frame, to obtain a reconstructed picture of the current frame.

For example, when it is determined that the current frame does not need to be decoded with reference to the resampled reference frame, the bitstream corresponding to the current frame may be directly input to the decoder, and then the decoder decodes, based on the reconstructed picture corresponding to the previous frame of the current frame, the bitstream corresponding to the current frame, to obtain the reconstructed picture of the current frame.

For example, whether the current frame needs to be used as a resampled reference frame for subsequent decoding is determined based on the reference frame parameter. For example, it may be determined whether the reference frame parameter includes a third identifier. When the reference frame parameter includes the third identifier, it may be determined whether a value of the third identifier is eleventh preset information. When the value of the third identifier is the eleventh preset information, it may be determined that the current frame needs to be used as the resampled reference frame for subsequent decoding. In this case, S909 may be performed. When the value of the third identifier is twelfth preset information, or the reference frame parameter does not include the third identifier, it may be determined that the current frame does not need to be used as the resampled reference frame for subsequent decoding, and the decoding procedure may be ended.

S909: When it is determined that the current frame needs to be used as the resampled reference frame for subsequent decoding, resample the reconstructed picture of the current frame. S910: Add a resampled reconstructed picture to the external reference list.

For example, for S901 to S910, refer to the foregoing descriptions of S809 to S810. Details are not described herein again.

Certainly, intra coding may also be performed on the resampled reconstructed picture, to obtain an intra-coded bitstream corresponding to the resampled reconstructed picture; and then the intra-coded bitstream corresponding to the resampled reconstructed picture is added to the external reference list. For details, refer to the foregoing descriptions. Details are not described herein again.

Figure 9B:
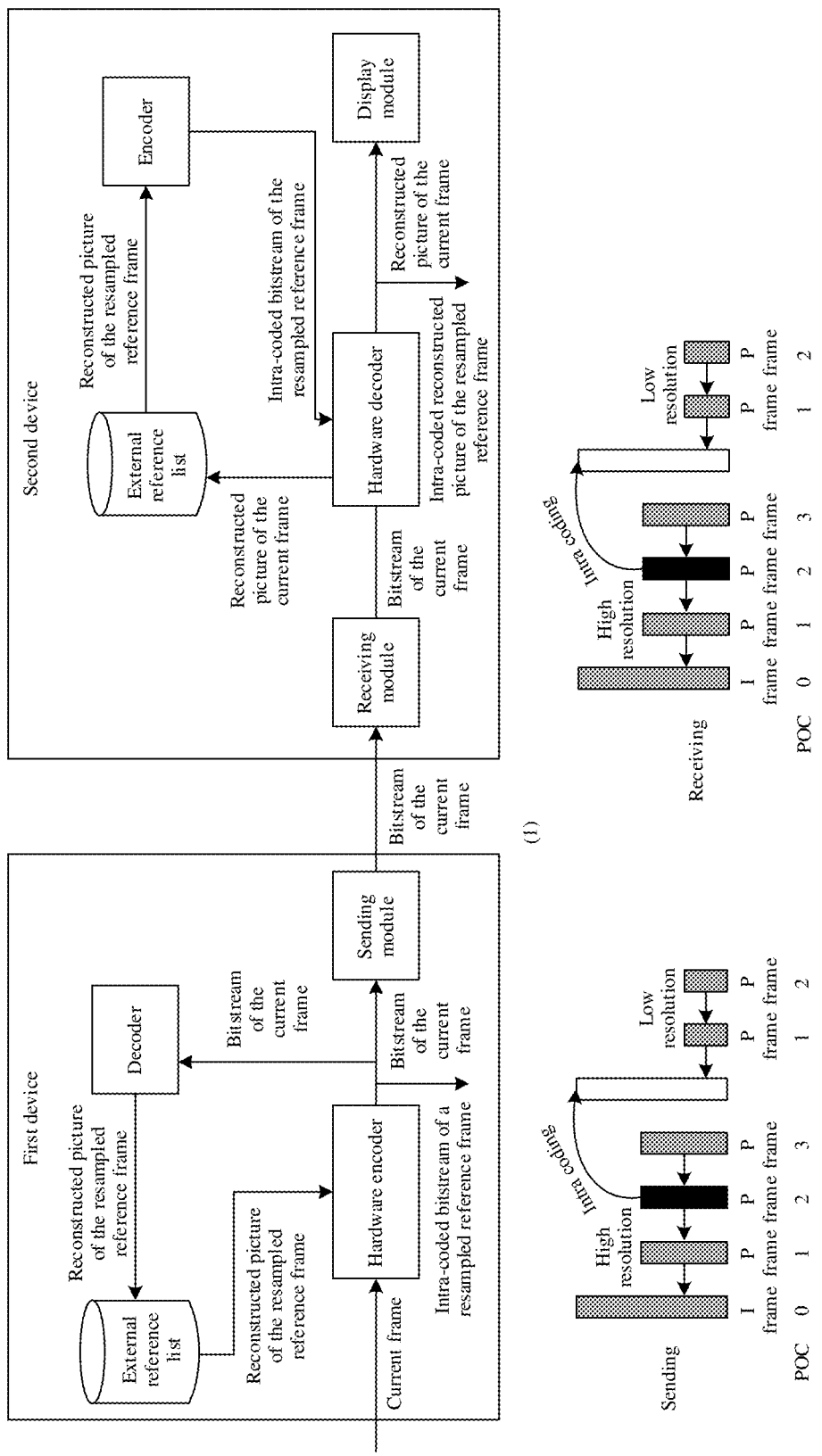
FIG. 9b is a diagram of an example of an encoding and decoding process.

FIG. 9b is a diagram of an example of an encoding and decoding process. In FIG. 9b(1), an encoder in a first device is a hardware encoder, and a decoder in a second device is a hardware decoder. In FIG. 9b(2), gray and black frames in a left area are frames sent by the first device, and gray and black frames in a right area are frames received by the second device. The black frame is a resampled reference frame.

It is assumed that a to-be-encoded video sequence is IPPPPP, a resampling setting rule is as follows: A setting period of resampling is reached, where the setting period of resampling is 4; and a resampling reference rule is as follows: A reference period of resampling is reached, where a reference period of a resampled reference frame is 5.

Encoding and decoding processes in FIG. 9b(1) and FIG. 9b(2) are similar to those in FIG. 5b(1) and FIG. 5b(2). Details are not described herein again. A difference lies in that, in FIG. 9b(1) and FIG. 9b(2), in the encoding process, a reconstructed picture of the third P frame may be resampled first, and then a resampled reconstructed picture of the third P frame is stored into an external reference list. Then, a third identifier may be added to a bitstream of the third P frame, the third identifier is assigned eleventh preset information, and third indication information (for example, 3), a resolution corresponding to the reconstructed picture of the third frame, and a resolution corresponding to the resampled reconstructed picture of the third frame are added to the bitstream of the third P frame. In a decoding process, the reconstructed picture of the third P frame may be resampled based on the third identifier, the resolution corresponding to the reconstructed picture of the third frame, and the resolution corresponding to the resampled reconstructed picture of the third frame. Then, the resampled reconstructed picture of the third P frame is stored into an external reference list based on the third indication information.

For example, the hardware encoder may perform encoding in combination with software encoding, to implement flexible reference frame management.

Figure 10:
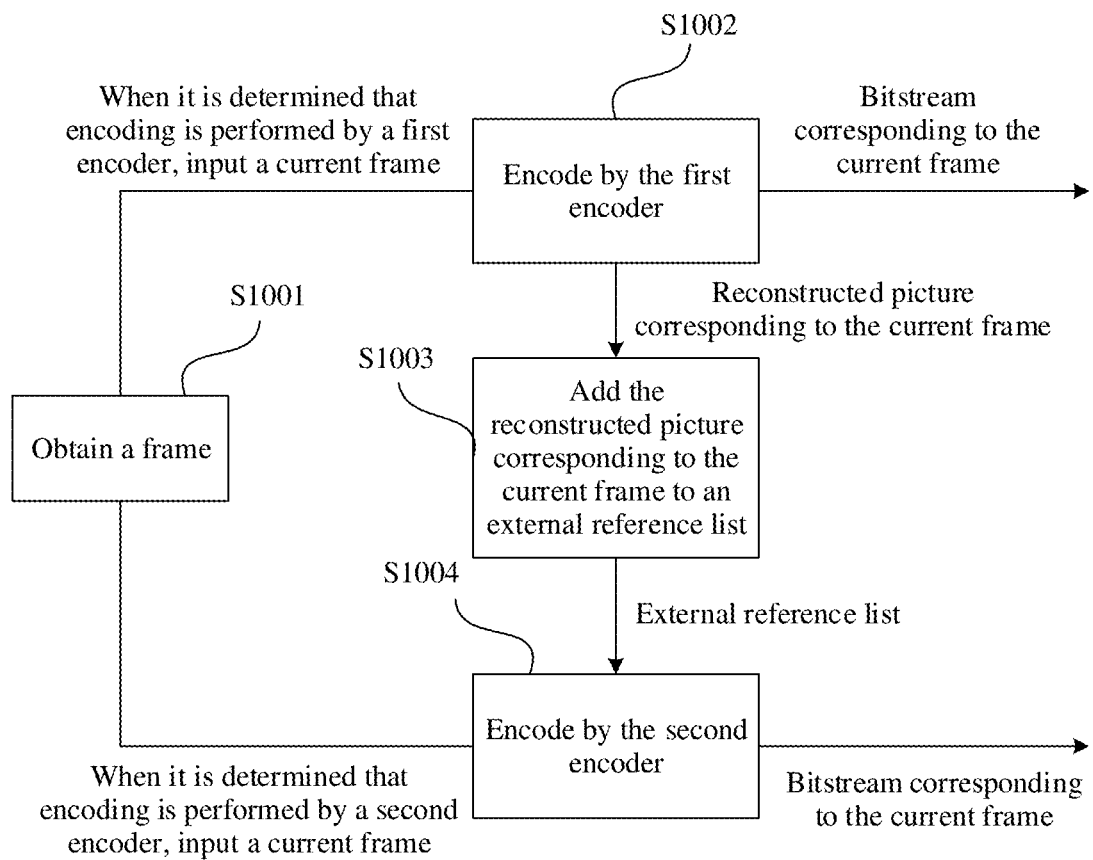
FIG. 10 is a diagram of an example of an encoding procedure.

FIG. 10 is a diagram of an example of an encoding procedure. The embodiment in FIG. 10 may be applied to a scenario in which a temporal layered reference frame is used for encoding. A hardware encoder may implement temporal layered encoding in combination with a software encoder. A first encoder is the hardware encoder, and a second encoder is the software encoder.

S1001: Obtain a current frame.

For example, after the current frame is obtained, it may be determined whether encoding is performed by the first encoder or the second encoder. For example, the hardware encoder performs encoding through frame-by-frame reference, and frames at a layer T0 in a temporal layered structure are encoded frame by frame, so that it may be determined whether the current frame is at the layer T0 in the temporal layered structure. When the current frame is at the layer T0 in the temporal layered structure, it is determined that encoding is performed by the first encoder; or when the current frame is not at the layer T0 in the temporal layered structure, it is determined that encoding is performed by the second encoder.

For example, whether the current frame is at the layer T0 in the temporal layered structure may be determined based on the temporal layered structure and a frame identifier of the current frame.

For example, it is assumed that the temporal layered structure is the temporal layered structure 1 in the embodiment in FIG. 6. If a GOP in which the current frame is located includes eight frames, when the current frame is the first frame, the third frame, the fifth frame, or the seventh frame, it may be determined that the current frame needs to be encoded by the first encoder. When the current frame is the second frame, the fourth frame, the sixth frame, or the eighth frame, it may be determined that the current frame needs to be encoded by the second encoder.

For another example, it is assumed that the temporal layered structure is the temporal layered structure 2 in the embodiment in FIG. 6. If a GOP in which the current frame is located includes 12 frames, when the current frame is the first frame, the fifth frame, or the ninth frame, it may be determined that the current frame needs to be encoded by the first encoder. If the current frame is the third frame, the seventh frame, the second frame, the fourth frame, the sixth frame, the eighth frame, the tenth frame, the eleventh frame, or the twelfth frame, it may be determined that the current frame needs to be encoded by the second encoder.

S1002: When it is determined that encoding needs to be performed by the first encoder, the first encoder encodes the current frame, to obtain a bitstream corresponding to the current frame.

S1003: Add a reconstructed picture generated based on the bitstream corresponding to the current frame to an external reference list of the second encoder, where the external reference list is located outside the second encoder.

For example, when it is determined that the current frame needs to be encoded by the first encoder, the current frame may be input to the first encoder for encoding, and the first encoder encodes the current frame, to obtain the bitstream corresponding to the current frame. When the current frame is an I frame, the first encoder may perform intra coding on the current frame, to obtain an intra-coded bitstream of the current frame. When the current frame is a P frame, the first encoder may perform inter coding on the current frame with reference to a reconstructed picture of a previous frame of the current frame, to obtain an intra-coded bitstream of the current frame.

Because the first encoder encodes frames at the layer T0, frames at another temporal layer (for example, T1, and T2) are usually encoded by using the frames at the layer T0 as a reference. Therefore, after the bitstream corresponding to the current frame is obtained, decoding may be performed based on the bitstream corresponding to the current frame, to obtain a reconstructed picture of the current frame. Then, the reconstructed picture of the current frame is added to the external reference list of the second encoder. In this way, when encoding a frame at a temporal layer other than the layer T0, a second decoder may obtain a reconstructed picture corresponding to a reference frame from an external reference list of the second decoder.

S1004: When it is determined that encoding needs to be performed by the second encoder, determine a reconstructed picture corresponding to a reference frame of the current frame from the external reference list; and encode, by the second encoder, the current frame based on the reconstructed picture corresponding to the reference frame of the current frame, to obtain the bitstream corresponding to the current frame.

For example, the second encoder further has a corresponding internal reference list. Each time a frame is encoded, the second encoder may add a reconstructed picture of the frame to the internal reference list.

Further, when it is determined that encoding needs to be performed by the second encoder, it may be determined, according to a temporal layering reference rule, whether encoding is performed based on the external reference list of the second encoder or based on the internal reference list of the second encoder. For example, the temporal layering reference rule may be set in the manner described in the embodiment in FIG. 6. Details are not described herein again.

For example, it is assumed that a reference determining rule in the temporal layering reference rule is the temporal layered structure 1, where a POC value is an integer other than 8×(n−1); and a reference frame determining condition is the reference manner 1. If the current frame is the eighth frame, it is determined, according to the reference frame determining condition in the temporal layering reference rule, that the eighth frame refers to the seventh frame. The seventh frame is encoded by the first encoder, so that it can be determined that encoding needs to be performed based on the external reference list. Then, a reconstructed picture corresponding to the reference frame of the current frame may continue to be determined from the external reference list according to the reference frame determining condition in the temporal layering reference rule. Subsequently, the second encoder may select the reconstructed picture corresponding to the reference frame of the current frame from the external reference list, put the reconstructed picture corresponding to the reference frame of the current frame into the internal reference list, and then encode the current frame based on the reconstructed picture corresponding to the reference frame of the current frame, to obtain a bitstream corresponding to the current frame.

For example, it is assumed that a reference determining rule in the temporal layering reference rule is the temporal layered structure 2, where a POC value is an integer other than 12×(n−1); and a reference frame determining condition is the reference manner 2. If the current frame is the eighth frame, it may be determined, according to the reference frame determining condition in the temporal layering reference rule, that the eighth frame refers to the seventh frame. The seventh frame is encoded by the second encoder, so that it can be determined that encoding needs to be performed with reference to the internal reference list. Then, a reconstructed picture corresponding to the reference frame of the current frame may continue to be determined from the internal reference list according to the reference frame determining condition in the temporal layering reference rule. Subsequently, the second encoder encodes the current frame based on the reconstructed picture corresponding to the reference frame of the current frame, to obtain a bitstream corresponding to the current frame.

For example, after encoding the current frame to obtain the bitstream corresponding to the current frame, the first encoder may add a first identifier, first indication information, a second identifier, and second indication information to the bitstream corresponding to the current frame. The first identifier may identify whether the current frame is encoded based on the external reference list, and may be an identifier (for example, a stream ID) of a bitstream corresponding to the reference frame of the current frame. The first indication information indicates a reconstructed picture corresponding to a temporal layered reference frame of the current frame in the external reference list. The second identifier identifies whether the current frame is used as a temporal layered reference frame for subsequent encoding, and the second indication information indicates a reconstructed picture of the current frame in the external reference list.

When the reconstructed picture corresponding to the reference frame of the current frame comes from the external reference list, the first identifier may be assigned first preset information (for example, "G1"), and the first indication information is assigned a frame identifier corresponding to the reconstructed picture corresponding to the temporal layered reference frame of the current frame in the external reference list. When the reconstructed picture corresponding to the reference frame of the current frame comes from the internal reference list, the first identifier may be assigned second preset information (for example, "G0"), and "NULL" is assigned to the first indication information.

For example, after it is determined that the current frame needs to be used as the temporal layered reference frame for subsequent encoding and the reconstructed picture of the current frame is added to the external reference list, the second identifier may be configured as third preset information (for example, "H1"), and the second indication information is assigned the frame identifier corresponding to the reconstructed picture corresponding to the temporal layered reference frame of the current frame in the external reference list. When it is determined that the current frame does not need to be used as the temporal layered reference frame for subsequent encoding, the second identifier may be configured as third preset information (for example, "H0"), and "NULL" is assigned to the second indication information.

Figure 11A:
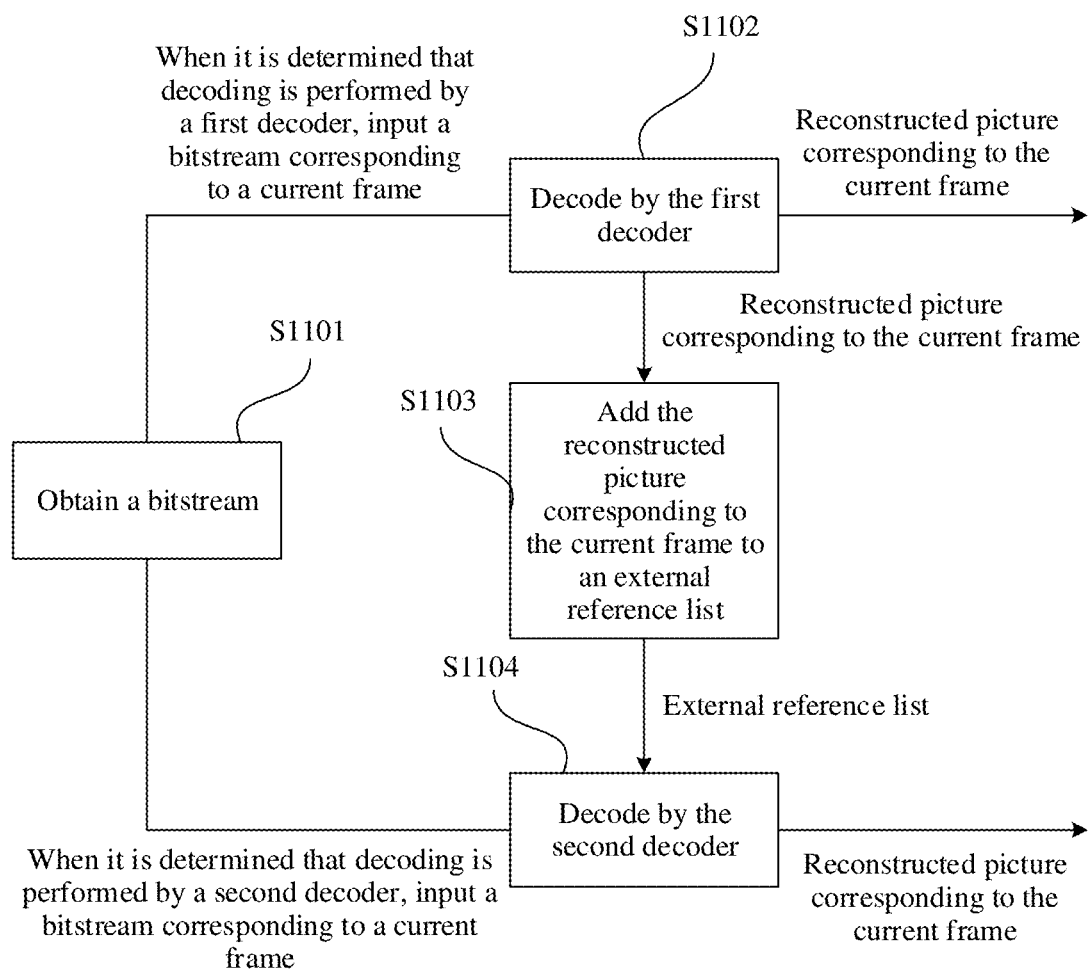
FIG. 11a is a diagram of an example of a decoding procedure.

FIG. 11a is a diagram of an example of a decoding procedure. In the embodiment in FIG. 11a, a scenario in which a temporal layered reference frame is used for decoding is described, and corresponds to the encoding process in the embodiment in FIG. 10. In a possible manner, both a first decoder and a second decoder are software decoders. In another possible manner, a first decoder is a hardware decoder, and a second decoder is a software decoder.

S1101: Receive a bitstream corresponding to a current frame.

For example, after the bitstream corresponding to the current frame is received, the bitstream corresponding to the current frame may be parsed, to obtain a reference frame parameter; and then whether decoding is performed by the first decoder is determined based on the reference frame parameter.

For example, after the reference frame parameter is parsed out from the bitstream corresponding to the current frame, it may be determined whether a first identifier is present in the reference frame parameter. When the first identifier is present in the reference frame parameter, it is determined whether a value of the first identifier is first preset information. If the value of the first identifier is the first preset information, it is determined that the current frame needs to be decoded with reference to an external reference list. In this case, it may be determined that decoding needs to be performed by the second decoder. In this case, S1104 may be performed. If the value of the first identifier is second preset information, or the reference frame parameter does not include the first identifier, it is determined that the current frame does not need to be decoded with reference to an external reference list. In this case, it may be determined that decoding needs to be performed by the first decoder. In this case, S1102 may be performed.

S1102: When it is determined that decoding needs to be performed by the first decoder, the first decoder decodes the bitstream corresponding to the current frame, to obtain a reconstructed picture of the current frame.

S1103: Add the reconstructed picture of the current frame to an external reference list of the second decoder, where the external reference list is located outside the second decoder.

For example, when it is determined that decoding is performed by the first decoder, the bitstream corresponding to the current frame may be input to the first decoder, and the first decoder decodes the bitstream corresponding to the current frame, to obtain the reconstructed picture of the current frame.

For example, after the reference frame parameter is parsed out from the bitstream corresponding to the current frame, it may be determined whether a second identifier is present in the reference frame parameter. When the second identifier is present in the reference frame parameter, it is determined whether a value of the second identifier is third preset information. If the value of the second identifier is the third preset information, it is determined that the current frame needs to be used as a temporal layered reference frame for subsequent decoding. In this case, the reconstructed picture of the current frame may be added to the external reference list of the second decoder. If the value of the second identifier is fourth preset information, or the reference frame parameter does not include the second identifier, it is determined that the current frame does not need to be used as a temporal layered reference frame for subsequent decoding.

S1104: When it is determined that decoding needs to be performed by the second decoder, determine a reconstructed picture corresponding to a reference frame of the current frame from the external reference list; and decode, by the second decoder based on the reconstructed picture corresponding to the reference frame, the bitstream corresponding to the current frame, to obtain the reconstructed picture of the current frame.

For example, when it is determined that decoding is performed by the first decoder, the reconstructed picture corresponding to the reference frame of the current frame may be determined from the external reference list based on first indication information in the reference frame parameter. Then, the reconstructed picture corresponding to the reference frame of the current frame is extracted from the external reference list, and stored into the internal reference list of the second decoder. Then, the second decoder decodes, based on the reconstructed picture corresponding to the reference frame of the current frame, the bitstream corresponding to the current frame, to obtain the reconstructed picture of the current frame.

Figure 11B:
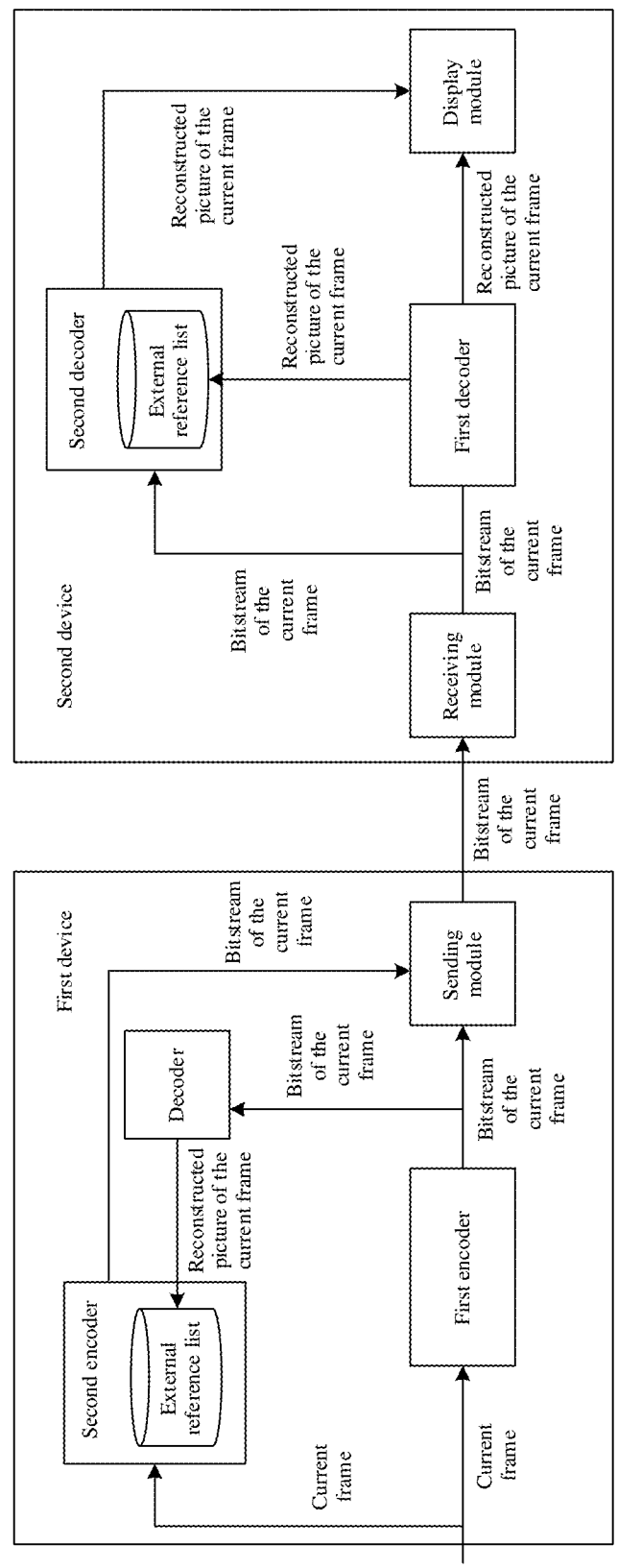
FIG. 11b is a diagram of an example of an encoding and decoding process.

FIG. 11b is a diagram of an example of an encoding and decoding process.

It is assumed that a temporal layered structure is as follows: The first frame (POC=0) and the third frame (POC=2) are at a layer T0, and the second frame (POC=1) and the fourth frame (POC=3) are at a layer T1. A corresponding reference manner is as follows: The third frame is encoded with reference to the first frame, the second frame is encoded with reference to the first frame, and the fourth frame is encoded with reference to the third frame.

Refer to FIG. 11b. In an encoding process, at a moment t0, when a current frame is an I frame, a first device may input the I frame to a first encoder, and the first encoder performs intra coding on the I frame, to obtain a bitstream of the I frame. Then, the bitstream of the I frame may be input to a decoder to obtain a reconstructed picture of the I frame output by the decoder, and then the reconstructed picture of the I frame is stored into an external reference list of a second encoder. Then, a second identifier may be added to the bitstream of the I frame, the second identifier is assigned third preset information, second indication information (for example, 0) is added to the bitstream of the I frame, and then the bitstream of the I frame to which a reference frame parameter is added is sent to a second device. At a moment t1, a current frame is the first P frame, the first P frame may be input to the second encoder, and the second encoder reads the reconstructed picture of the I frame from the external reference list to an internal reference list. Then, the first P frame is encoded based on the reconstructed picture of the I frame, to obtain a bitstream of the first P frame. Then, a first identifier may be added to a bitstream of one P frame, the first identifier is assigned first preset information, first indication information (for example, 0) is added the bitstream of the P frame, and then the bitstream of the first P frame to which a reference frame parameter is added is sent to the second device. At a moment t2, a current frame is the second P frame, the second P frame may be input to the first encoder, and the first encoder encodes the second P frame based on the reconstructed picture of the I frame, to obtain a bitstream of the second P frame. Then, the bitstream of the second P frame may be input to the decoder to obtain a reconstructed picture of the second P frame output by the decoder, and then the reconstructed picture of the second P frame is stored into the external reference list of the second encoder. Then, the first identifier may be added to the bitstream of the second P frame, the first identifier is assigned the first preset information, and the first indication information (for example, 0) is added to the bitstream of the second P frame; and a second identifier is added to the bitstream of the second P frame, the second identifier is assigned third preset information, and second indication information (for example, 2) is added to the bitstream of the second P frame. Then, the bitstream of the second P frame to which a reference frame parameter is added is sent to the second device. At a moment t3, a current frame is the third P frame, the third P frame may be input to the second encoder, and the second encoder reads the reconstructed picture of the second P frame from the external reference list to the internal reference list. Then, the third P frame is encoded based on the reconstructed picture of the second P frame, to obtain a bitstream of the third P frame. Then, the first identifier may be added to bitstreams of three P frames, the first identifier is assigned the first preset information, the first indication information (for example, 2) is added to the bitstreams of the three P frames, and then the bitstream of the third P frame to which the reference frame parameter is added is sent to the second device.

Refer to FIG. 11b. In a decoding process, at the moment t0, when a current frame is the I frame, the second device may input the bitstream of the I frame to a first decoder, and the first decoder performs intra decoding on the I frame, to obtain the reconstructed picture of the I frame. Then, the reconstructed picture of the I frame may be stored into an external reference list of a second decoder based on the second identifier and the second indication information. In addition, the reconstructed picture of the I frame may be sent to a display module for display. At the moment t1, a current frame is the first P frame, the bitstream of the first P frame may be input to the second decoder, and the second decoder reads the reconstructed picture of the I frame from the external reference list to an internal reference list based on the first identifier and the first indication information. Then, the bitstream of the first P frame is decoded based on the reconstructed picture of the I frame, to obtain a reconstructed picture of the first P frame. Then, the reconstructed picture of the first P frame may be sent to the display module for display. At the moment t2, a current frame is the second P frame, the bitstream of the second P frame may be input to the first decoder, and the first decoder decodes the bitstream of the second P frame based on the reconstructed picture of the I frame, to obtain the reconstructed picture of the second P frame. Then, the reconstructed picture of the second P frame may be stored into the external reference list of the second decoder based on the second identifier and the second indication information. In addition, the reconstructed picture of the second P frame may be sent to the display module for display. At the moment t3, a current frame is the third P frame, the bitstream of the third P frame may be input to the second decoder, and the second decoder reads the reconstructed picture of the second P frame from the external reference list to the internal reference list based on the first identifier and the first indication information. Then, the bitstream of the third P frame is decoded based on the reconstructed picture of the second P frame, to obtain a reconstructed picture of the third P frame. The reconstructed picture of the third P frame may be sent to the display module for display.

In the embodiments shown in FIG. 10 and FIG. 11a, neither a decoder side nor an encoder side needs to perform intra coding on a reconstructed picture of a reference frame, and then perform encoding/decoding based on an intra-coded reconstructed picture. This can improve picture quality.

Figure 12:
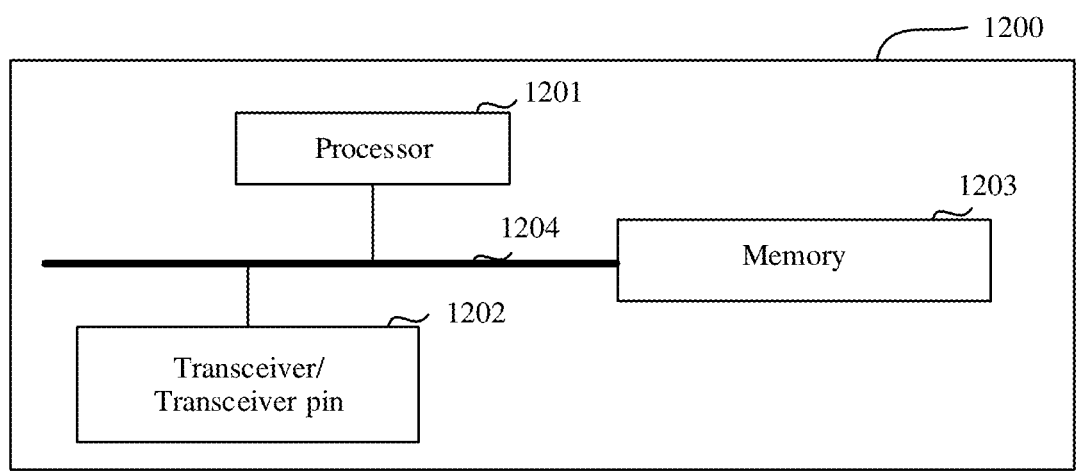
FIG. 12 is a diagram of a structure of an example of an apparatus.

In an example, FIG. 12 is a schematic block diagram according to an embodiment of this application. An apparatus 1200 may include a processor 1201 and a transceiver/transceiver pin 1202, and optionally further includes a memory 1203.

Components of the apparatus 1200 are coupled together through a bus 1204. In addition to a data bus, the bus 1204 further includes a power bus, a control bus, and a status signal bus. However, for clear description, various buses are referred to as the bus 1204 in the figure.

Optionally, the memory 1203 may store instructions used in the foregoing method embodiments. The processor 1201 may be configured to execute the instructions in the memory 1203, control a receiving pin to receive a signal, and control a sending pin to send a signal.

The apparatus 1200 may be an electronic device in the foregoing method embodiments or a chip of the electronic device.

All related content of the steps in the foregoing method embodiments may be cited in function descriptions of the corresponding functional modules. Details are not described herein again.

An embodiment further provides a computer-readable storage medium. The computer-readable storage medium stores computer instructions. When the computer instructions are run on an electronic device, the electronic device is enabled to perform the foregoing related method steps, to implement the encoding methods and decoding methods in the foregoing embodiments.

An embodiment further provides a computer program product. When the computer program product runs on a computer, the computer is enabled to perform the foregoing related steps, to implement the encoding methods and decoding methods in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the encoding methods and decoding methods in the foregoing method embodiments.

The electronic device, the computer-readable storage medium, the computer program product, or the chip provided in embodiments of this application is configured to perform the corresponding method provided above. Therefore, for beneficial effects that can be achieved, refer to the beneficial effects in the corresponding method provided above. Details are not described herein.

Based on the descriptions of the foregoing implementations, it may be understood by a person skilled in the art that, for ease and brevity of description, division into the foregoing functional modules is merely used as an example for description. During actual application, the foregoing functions may be allocated to different functional modules for implementation based on a requirement, that is, an internal structure of an apparatus is divided into different functional modules, to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units. To be specific, the parts may be located in one place, or may be distributed in a plurality of different places. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

Any content in embodiments of this application and any content in a same embodiment can be freely combined. Any combination of the foregoing content falls within the scope of this application.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope of the claims, and all the modifications shall fall within the protection of this application.

Methods or algorithm steps described in combination with the content disclosed in embodiments of this application may be implemented in a hardware manner, or may be implemented in a manner of executing a software instruction by a processor. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

A person skilled in the art should be aware that in the foregoing one or more examples, functions described in embodiments of this application may be implemented by using hardware, software, firmware, or any combination thereof. When the functions are implemented by using software, the foregoing functions may be stored in a computer-readable medium or transmitted as one or more instructions or code in a computer-readable medium. The computer-readable medium includes a computer-readable storage medium and a communication medium, where the communication medium includes any medium that enables a computer program to be transmitted from one place to another. The storage medium may be any available medium that can be accessed by a general-purpose or dedicated computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope of the claims, and all the modifications shall fall within the protection of this application.

What is claimed is:

1. An encoding method, wherein the method comprises:
obtaining a current frame;
obtaining a reconstructed picture corresponding to a reference frame of the current frame from an external reference list of an encoder, wherein the reference frame of the current frame is a frame encoded by the encoder, and the external reference list is independent of the encoder;
performing, by the encoder, intra coding on the reconstructed picture; and
performing, by the encoder, inter coding on the current frame based on a result of the intra coding, to obtain a bitstream corresponding to the current frame.

2. The method according to claim 1, wherein the method further comprises:
when it is determined that the current frame needs to be used as a reference frame for subsequent encoding, generating a reconstructed picture of the current frame based on the bitstream corresponding to the current frame; and
adding the reconstructed picture of the current frame to the external reference list.

3. The method according to claim 2, wherein the adding the reconstructed picture of the current frame to the external reference list comprises:
resampling the reconstructed picture of the current frame; and
adding a resampled reconstructed picture to the external reference list.

4. The method according to claim 1, wherein
the bitstream corresponding to the current frame comprises a first identifier and first indication information; and
the first identifier identifies whether the current frame is encoded based on the external reference list, and the first indication information indicates the reconstructed picture corresponding to the reference frame of the current frame in the external reference list.

5. The method according to claim 1, wherein
the bitstream corresponding to the current frame comprises a second identifier and second indication information; and
the second identifier identifies whether the current frame is used as the reference frame for subsequent encoding, and the second indication information indicates the reconstructed picture of the current frame in the external reference list.

6. The method according to claim 1, wherein
the bitstream corresponding to the current frame comprises a third identifier, third indication information, and a resampling resolution; and the third identifier identifies whether resampling is performed on the current frame, the third indication information indicates the resampled reconstructed picture of the current frame in the external reference list, and the resampling resolution comprises a resolution corresponding to the reconstructed picture of the current frame and a resolution corresponding to the resampled reconstructed picture.

7. The method according to claim 1, wherein the method further comprises:
modifying a standard syntax element that is used to identify the reference frame of the current frame and that is in the bitstream corresponding to the current frame, wherein
the standard syntax element is a syntax element specified in a standard coding protocol.

8. The method according to claim 7, wherein the standard syntax element that is used to identify the reference frame of the current frame comprises at least one of the following:
a syntax element used to identify a quantity of long-term reference frames;
a syntax element used to identify a picture order count POC of a long-term reference frame;
a syntax element used to identify whether a long-term reference frame is used as a reference for the current frame;
a syntax element used to identify whether a negative reference frame is used;
a syntax element used to identify a quantity of negative reference frames;
a syntax element used to identify a distance between the current frame and a negative reference frame; and
a syntax element used to identify whether a negative reference frame is used as a reference for the current frame.

9. The method according to claim 1, wherein the obtaining a reconstructed picture corresponding to a reference frame of the current frame from an external reference list of an encoder comprises:
determining whether a preset reference rule is satisfied; and
determining reference indication information according to the preset reference rule when the preset reference rule is satisfied; and
obtaining, based on the reference indication information, the reconstructed picture corresponding to the reference frame of the current frame from the external reference list of the encoder.

10. The method according to claim 9, wherein
the preset reference rule comprises any one of the following: a long-term reference rule, a temporal layering reference rule, and a resampling reference rule.

11. The method according to claim 10, wherein the long-term reference rule comprises at least one of the following:
a reference period of a long-term reference frame is reached;
a bitstream corresponding to a preset reference frame of the current frame is lost; and
a reconstructed picture whose similarity with the current frame is higher than a similarity threshold is in the external reference list.

12. The method according to claim 1, wherein the result of the intra coding comprises an intra-coded reconstructed picture of the reconstructed picture corresponding to the reference frame of the current frame; and
the performing, by the encoder, inter coding on the current frame based on a result of the intra coding, to obtain a bitstream corresponding to the current frame comprises:
performing, by the encoder, inter coding on the current frame by using the intra-coded reconstructed picture as a reference, to obtain the bitstream corresponding to the current frame.

13. The method according to claim 1, wherein the reference frame of the current frame is a long-term reference frame, a temporal layered reference frame, or a resampled reference frame.

14. The method according to claim 1, wherein the encoder is a hardware encoder.

15. A decoding method, wherein the method comprises:
receiving a bitstream corresponding to a current frame;
determining a reconstructed picture corresponding to a reference frame of the current frame from an external reference list of a decoder, wherein the reference frame of the current frame is a frame decoded by the decoder, and the external reference list is independent of the decoder;
performing intra coding on the reconstructed picture, to obtain a corresponding intra-coded bitstream;
performing, by the decoder, intra decoding on the intra-coded bitstream; and
performing, by the decoder based on a result of the intra decoding, inter decoding on the bitstream corresponding to the current frame, to obtain a reconstructed picture of the current frame.

16. The method according to claim 15, wherein the method further comprises:
when it is determined that the current frame needs to be used as a reference frame for subsequent decoding, adding the reconstructed picture of the current frame to the external reference list.

17. The method according to claim 16, wherein the adding the reconstructed picture of the current frame to the external reference list comprises:
resampling the reconstructed picture of the current frame; and
adding a resampled reconstructed picture to the external reference list.

18. The method according to claim 15, wherein the determining a reconstructed picture corresponding to a reference frame of the current frame from an external reference list of a decoder comprises:
parsing the bitstream corresponding to the current frame, to obtain a reference frame parameter; and
determining, based on the reference frame parameter, the reconstructed picture corresponding to the reference frame of the current frame from the external reference list of the decoder.

19. An encoder, comprising:
one or more processors; and
a non-transitory computer-readable storage medium coupled to the processor and storing instructions, wherein when the instructions are executed by the processor, the encoder is enabled to perform the following operations:
obtaining a current frame;
obtaining a reconstructed picture corresponding to a reference frame of the current frame from an external reference list of the encoder, wherein the reference frame of the current frame is a frame encoded by the encoder, and the external reference list is independent of the encoder;
performing intra coding on the reconstructed picture; and
performing inter coding on the current frame based on a result of the intra coding, to obtain a bitstream corresponding to the current frame.

20. The encoder according to claim 19, wherein the operations further comprise:
when it is determined that the current frame needs to be used as a reference frame for subsequent encoding, generating a reconstructed picture of the current frame based on the bitstream corresponding to the current frame; and
adding the reconstructed picture of the current frame to the external reference list.

* * * * *